(12) United States Patent
Schmid

(10) Patent No.: US 9,121,688 B1
(45) Date of Patent: Sep. 1, 2015

(54) LAYOUT TOOL FOR USE WITH A FRAMING SQUARE

(71) Applicant: Stephen F. Schmid, Cordova, AK (US)

(72) Inventor: Stephen F. Schmid, Cordova, AK (US)

(*) Notice: Subject to any disclaimer, the term of this patent is extended or adjusted under 35 U.S.C. 154(b) by 239 days.

(21) Appl. No.: 13/849,020

(22) Filed: Mar. 22, 2013

(51) Int. Cl.
| | |
|---|---|
| *G01C 3/04* | (2006.01) |
| *G01C 3/10* | (2006.01) |
| *B43L 7/00* | (2006.01) |
| *G01B 3/20* | (2006.01) |
| *B43L 7/10* | (2006.01) |
| *B43L 13/00* | (2006.01) |
| *B43L 7/14* | (2006.01) |
| *B43L 7/12* | (2006.01) |
| *E04D 15/00* | (2006.01) |
| *B25H 7/04* | (2006.01) |
| *E04F 21/00* | (2006.01) |
| *B25H 7/02* | (2006.01) |
| *B25H 7/00* | (2006.01) |

(52) U.S. Cl.
CPC ... *G01B 3/20* (2013.01); *B25H 7/00* (2013.01); *B25H 7/02* (2013.01); *B25H 7/04* (2013.01); *B43L 7/10* (2013.01); *B43L 7/12* (2013.01); *B43L 7/14* (2013.01); *E04D 15/00* (2013.01); *E04F 21/003* (2013.01)

(58) Field of Classification Search
CPC .............. B25H 7/04; B25H 7/02; B25H 7/00; B43L 7/10; B43L 7/12; B43L 7/14; E04F 21/003; E04D 15/00
USPC ........... 33/240, 485, 417, 420, 421, 416, 418, 33/419
See application file for complete search history.

(56) References Cited

U.S. PATENT DOCUMENTS

| | | | | |
|---|---|---|---|---|
| 538,051 | A * | 4/1895 | Taylor ............................. | 33/418 |
| 935,067 | A | 9/1909 | Taylor | |
| 1,189,983 | A * | 7/1916 | McLeod ......................... | 33/421 |
| 2,908,080 | A * | 10/1959 | Varbel ............................. | 33/423 |
| 3,289,301 | A * | 12/1966 | Hanson .......................... | 33/353 |
| 4,420,891 | A * | 12/1983 | Orem ............................. | 33/476 |
| 4,761,890 | A * | 8/1988 | Morrell .......................... | 33/473 |
| 6,070,334 | A | 6/2000 | Pretsch, Jr. | |
| 7,197,833 | B1 | 4/2007 | Ekern | |
| 7,478,485 | B1 * | 1/2009 | Rogell ............................ | 33/421 |
| 7,698,827 | B2 * | 4/2010 | Lee et al. ........................ | 33/471 |
| 7,854,070 | B1 * | 12/2010 | Vajentic .......................... | 33/417 |
| 8,371,035 | B2 * | 2/2013 | Al-Mutairi .................... | 33/27.02 |
| 2011/0107610 | A1 * | 5/2011 | Farr et al. ....................... | 33/421 |

FOREIGN PATENT DOCUMENTS

WO     WO2004109221 A1 * 12/2004
WO     WO 2004109221 A2 * 12/2004

* cited by examiner

*Primary Examiner* — Laura Martin
*Assistant Examiner* — Rhyan C Lange
(74) *Attorney, Agent, or Firm* — Michael J. Tavella

(57) ABSTRACT

An attachment tool for framing squares. The tool is made of a pair of straight members that are fastened together with a space therebetween. Each of the members has a pair of horizontal grooves that are aligned. A fasteners is positioned within each of the grooves to lock a framing square in place once the desired setting have been determined. The tool has markings on each face that are used to establish angles for desired cuts. Using pivot points that are placed on the tool, the framing square can be set at one point and the pivoted to the desired angle using the markings on the tool without having to calculate anything. In this way, many different types of building members including: rafters, trusses and stairs can be laid out, marked and cut with minimal error and optimal efficiency.

16 Claims, 36 Drawing Sheets

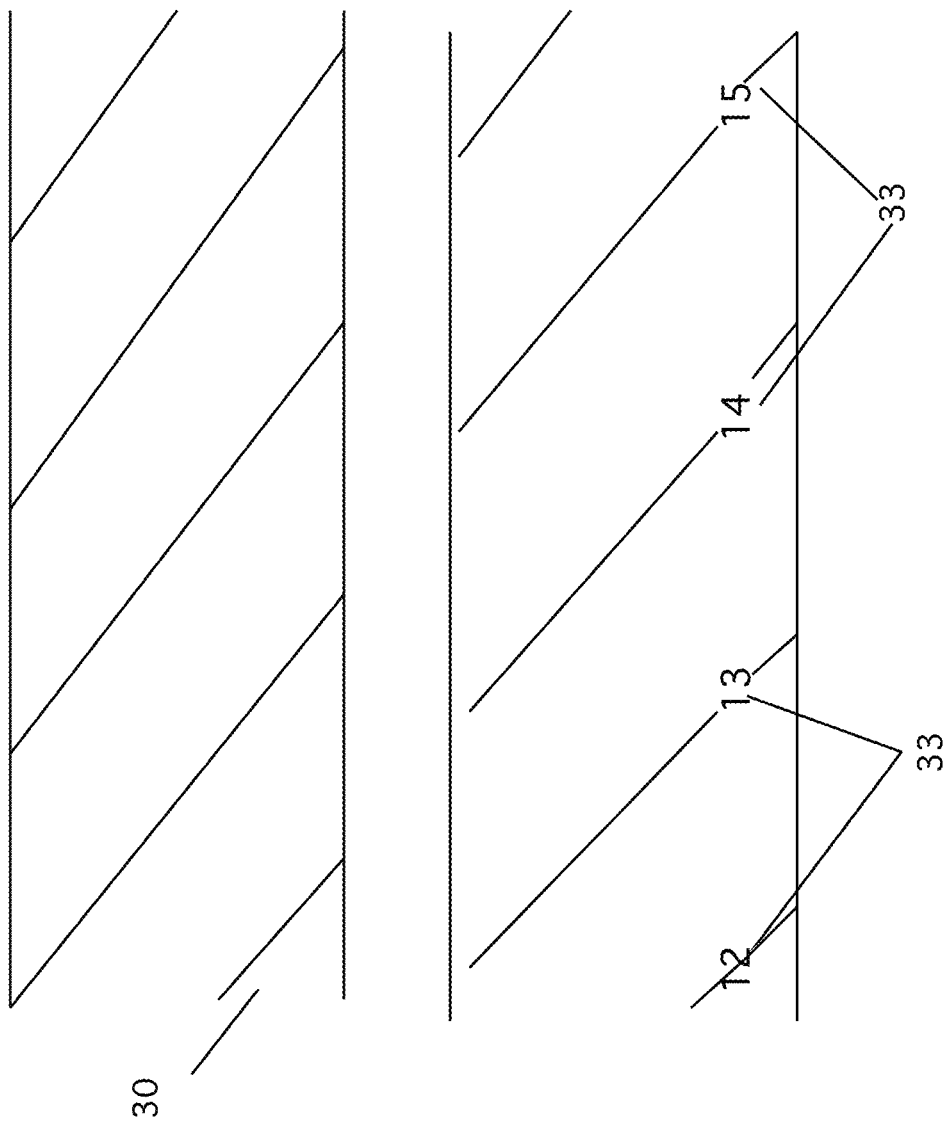

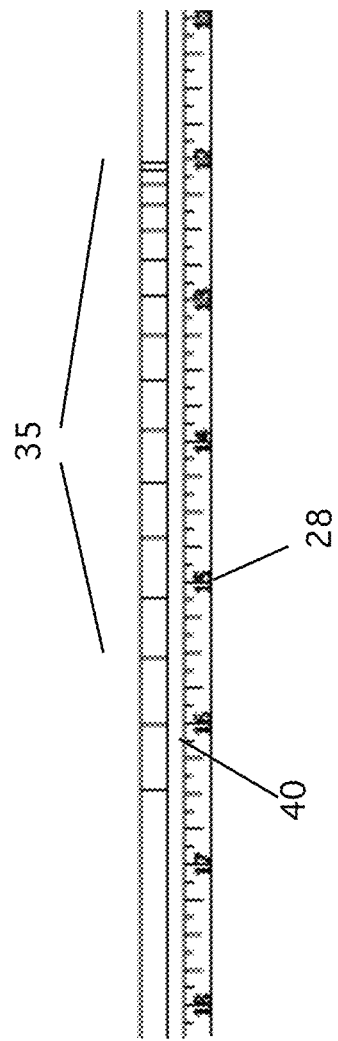

LAYOUT TOOL FOR USE WITH A FRAMING SQUARE

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to layout tools for framing squares and particularly to layout tools that have alignment mechanisms and markings, which attach to framing squares.

2. Description of the Prior Art

Framing squares are a ubiquitous tool of carpenters and other builders. This tool is used to layout rafters and stair stringers as well as many other functions. In the case of rafters and stairs, many calculations are required, depending on the type of rafter (e.g., hip rafter, valley rafter, etc.) and stairs. It takes a lot of experience to do this work properly and consistently. Once the calculations have been made, the carpenter uses the framing square to mark construction material with the lines used to cut the rafter or stair stringers. Again, care must be used to ensure that the cut lines are correct as time and material are wasted once a board has been cut improperly. Another problem with using the square is that rafters and stair stringers require many layout marks. A square, by itself, must be positioned, and aligned with the proper measurements each time a cut is made; this takes time and adds to the possibility of error.

Over the years, people have developed tools that can assist the carpenter in making these measurements and cuts. One such example is found in U.S. Pat. No. 935,067 To Taylor. This too shows a small square that has a groove cut into each major axis of the square. A straight rule, with two grooves cut in it is attached to the square and held by to fasteners that are placed through the grooves in both the rule and the square. The rule can then be positioned across the square and locked into the measured lengths so that repeated marks can be made with minimal error. The problem with this device is that it requires the square to have the grooves into which the fasteners are secured. Moreover, to use the square for other applications, the rule must be removed, which takes time. Another tool that helps is found in U.S. Pat. No. 6,070,334 to Pretsch, Jr. This design is a simple straightedge that is secured to a common framing square so that it forms a straight edge that can be abutted against a board so that the proper cut lines can be drawn. This tool is better than the Taylor device in that it can be used on a standard framing square. However, the user must make the calculations as before; thus, there is limited advantage to using this tool. Another tool is found in U.S. Pat. No. 7,197,833 to Ekern. In this design, the tool has a pair of groves cut through the tool. The framing square is slid into these grooves and placed in the proper position. Then, the tool is locked in place and the tool can be used as a straight edge. One advantage of the Ekern tool as compared to the Pretsch, Jr. tool is that, because of the body groove, the tool has a body on both the top and bottom of the square. This allows the tool to the placed against the board above or below the top surface of the board. However, as before, this tool still requires the user to calculate the angles and determine the position of the straight edge on the square as before.

BRIEF DESCRIPTION OF THE INVENTION

The instant invention overcomes these difficulties. It is an object of this invention to produce an attachment for a framing square that allows for the layout and cutting of common rafters from one pivot point by placing the tool on the framing square and directly arriving at the desired angle without making prior calculations.

It is another object of this invention to produce an attachment for a framing square that allows for the scribing angles by directly using the tool.

It is yet another object of this invention to produce an attachment for a framing square that allows for the layout and cutting of hip and valley rafters from one pivot point by placing the tool on the framing square and directly arriving at the desired angle without having to make prior calculations.

It is another object of this invention to produce an attachment for a framing square that allows for the determination of the length per foot of run from one pivot point to determine the appropriate rafter length.

It is yet another object of this invention to produce an attachment for a framing square that allows for level cuts for truss fabrication and roof framing.

It is yet another object of this invention to produce an attachment for a framing square that allows for the layout and cutting of stair stringers by placing the tool on the framing square and directly arriving at the desired angle without having to make prior calculations.

It is yet another object of this invention to produce an attachment for a framing square that allows for the use of the framing square as a Tee square.

With those objects in mind, the invention is made of a pair of straight members that are fastened together with a space therebetween. Each of the members has a pair of horizontal grooves that are aligned. A fastener is positioned within each of the grooves to lock a framing square in place once the desired setting have been determined. The tool has markings on each face that are used to establish angles for desired cuts. Using pivot points that are placed on the tool, the framing square can be set at one point and then pivoted to the desired angle using the markings on the tool without having to calculate anything. In this way, many different types of building members including: rafters, trusses and stairs can be laid out, marked and cut with minimal error and optimal efficiency.

BRIEF DESCRIPTION OF THE DRAWINGS

FIG. 1c is an enlarged view of a portion of FIG. 1a.
FIG. 2c is an enlarged view of a portion of FIG. 2a.

FIG. 9c is an enlarged view of a portion of FIG. 9a.

FIG. 9d is an enlarged view of a portion of FIG. 9b.

FIG. 10c is an enlarged view of a portion of FIG. 10a.

FIG. 12b is an enlarged view of a portion of the left side of FIG. 12.

DETAILED DESCRIPTION OF THE INVENTION

Figure 1:
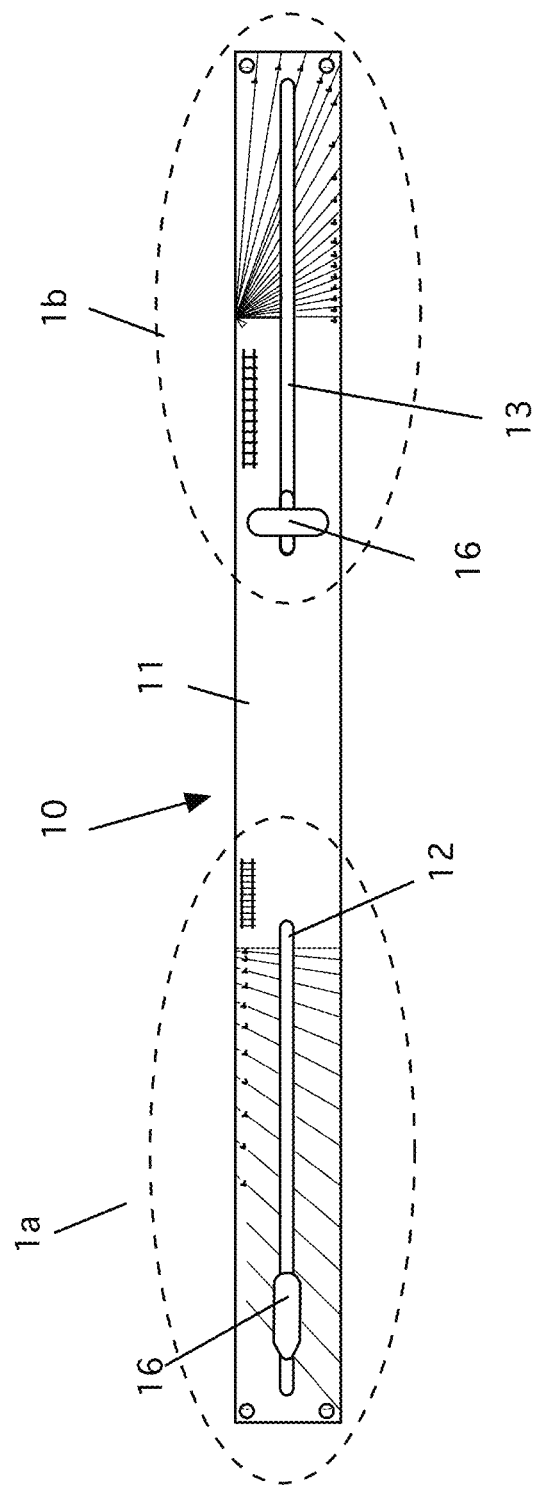
FIG. 1 is a front view of a first embodiment of the invention.

Referring now to FIGS. 1, 1a, 1b, 1c and 1d, a front view of the first embodiment of the invention is shown. This embodiment is designed to be used with standard framing squares. These squares, also known as steel squares have a short arm that is typically 16 inches long and a long arm, set at 90° to the short arm, that is typically 24 inches long. The front of the first embodiment consists of a panel 11 that has two slots 12 and 13 formed in it. In this embodiment, the slots 12 and 13 are 9 inches long and are 5/16 inches wide. A back panel 14 (see FIG. 2) is attached by fasteners 15 (see FIG. 3a, or 4a) which can be considered as a means for attaching the front and back panels as well as a means for separating the two panels. The second panel has matching slots 12a and 13a in it such that when the two panels are connected, the slots align as shown. Knobs 16 are installed in the slots 12, 12a, 13 and 13a, which allow the device to clamp down on a framing square that has been inserted in the device, as discussed below. The combination of the slots and knobs is considered as a means for temporarily locking the invention onto a framing square.

As shown, the front panel has a number of markings on it used for various purposes. FIG. 1a is an enlarged view of the left side of FIG. 1. FIG. 1c is an enlarged view of a portion of FIG. 1a. Here, markings 17 refer to common rafter roof pitches. Note that roof pitch is a measure of the steepness of a roof. It is typically expressed in ratios e.g., "3:12" or "5:12"). Pitch is expressed as rise over run. Thus, a "3:12" pitch means a 3-inch rise over a 12 inch run. Note also that common pitch is a 12 in run. The lines on the left of the device align with a framing square, as discussed below and indicate the rise of the pitch ranging from 1 to 14. These markings consist of 15 lines that begin with a vertical line that is placed at 12 inches from the pivot point 18, discussed below.

The markings 17 consist of 16 lines placed at specific locations and angles. Below are the dimensions and the angles of the common pitch markings for the tool. These dimensions are measured from the 12" pivot point:

TABLE 1

Placement of Common Rafter Lines

| Roof Pitch | Distance from Pivot Point | Angle |
| --- | --- | --- |
| 1:12 | 12.042" | 4.674 deg |
| 2:12 | 12.166" | 9.462 deg |
| 3:12 | 12.369" | 14.036 deg |
| 4:12 | 12.649" | 18.435 deg |
| 5:12 | 13" | 22.620 deg |
| 6:12 | 13.416" | 26.565 deg |
| 7:12 | 13.892" | 30.256 deg |
| 8:12 | 14.422" | 33.690 deg |
| 9:12 | 15" | 36.870 deg |
| 10:12 | 15.621" | 39.806 deg |
| 11:12 | 16.279" | 42.510 deg |
| 12:12 | 16.971" | 45 deg |
| 13:12 | 17.692" | 47.291 deg |
| 14:12 | 18.439" | 49.399 deg |
| 15:12 | 19.209" | 51.340 deg |
| 16:12 | 20" | 53.130 deg |

Figure 1A:
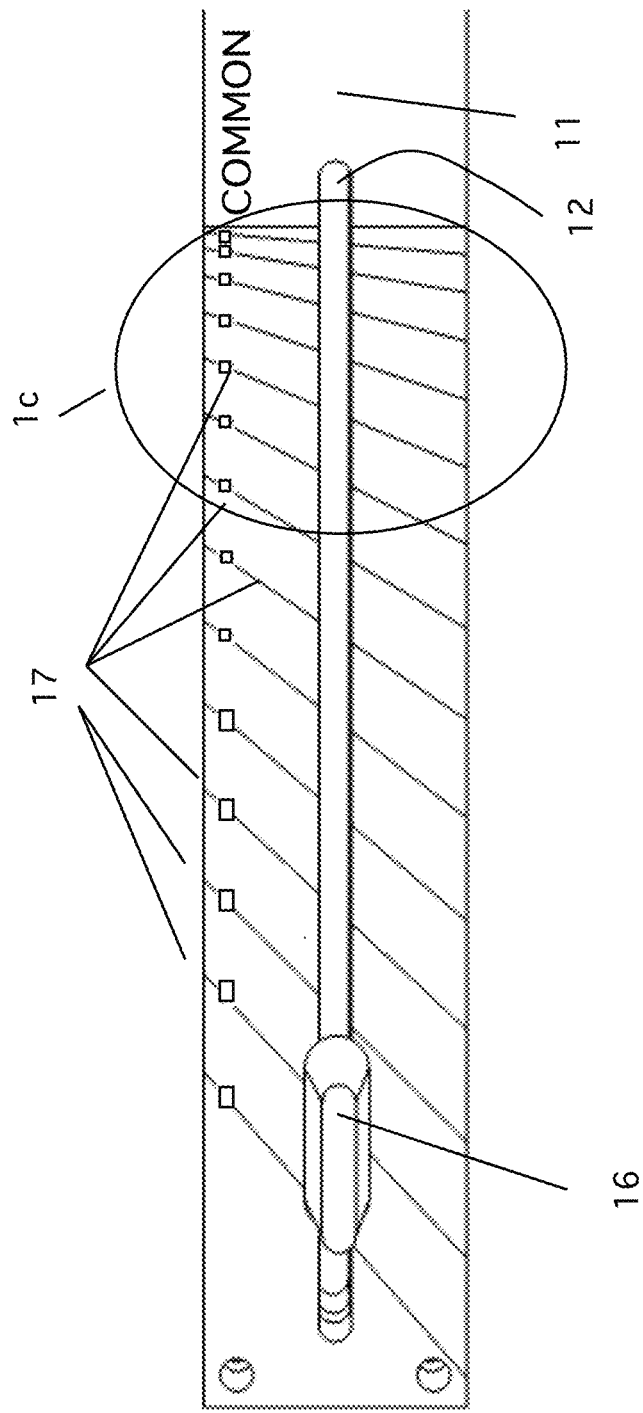
FIG. 1a is an enlarged view of the left side of FIG. 1.
Figure 1B:
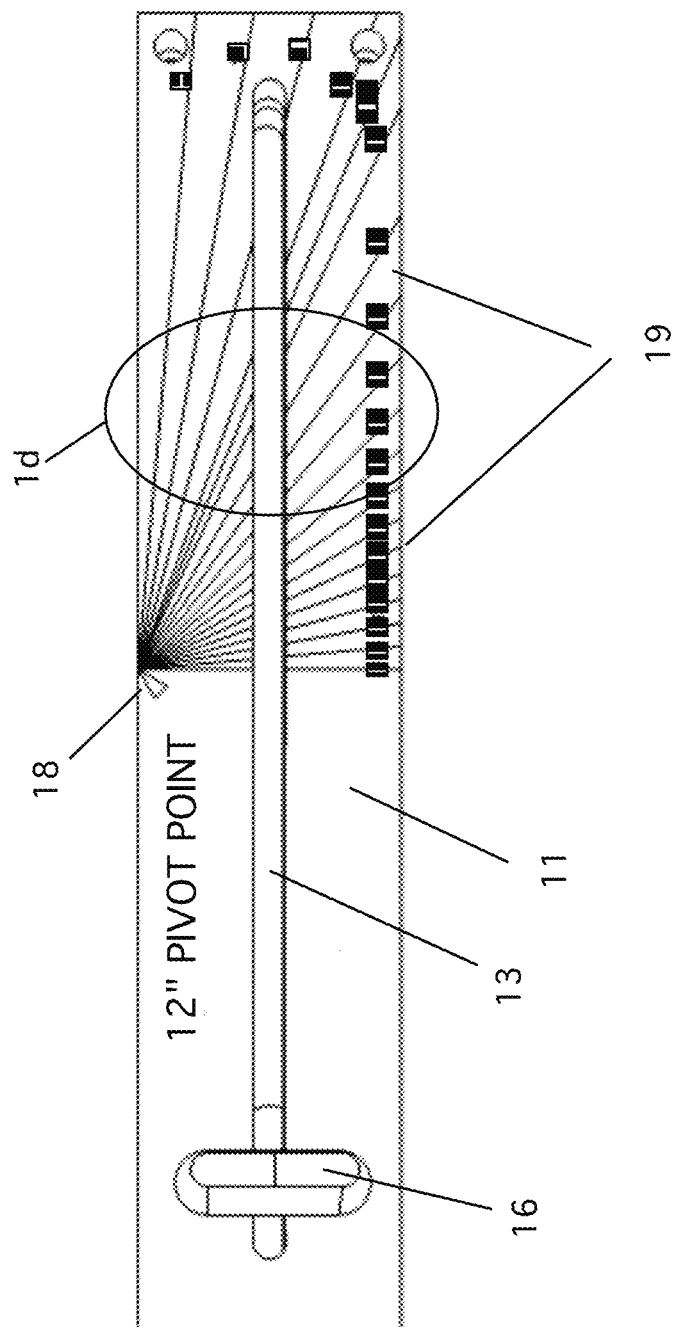
FIG. 1b is an enlarged view of the right side of FIG. 1.
Figure 1C:
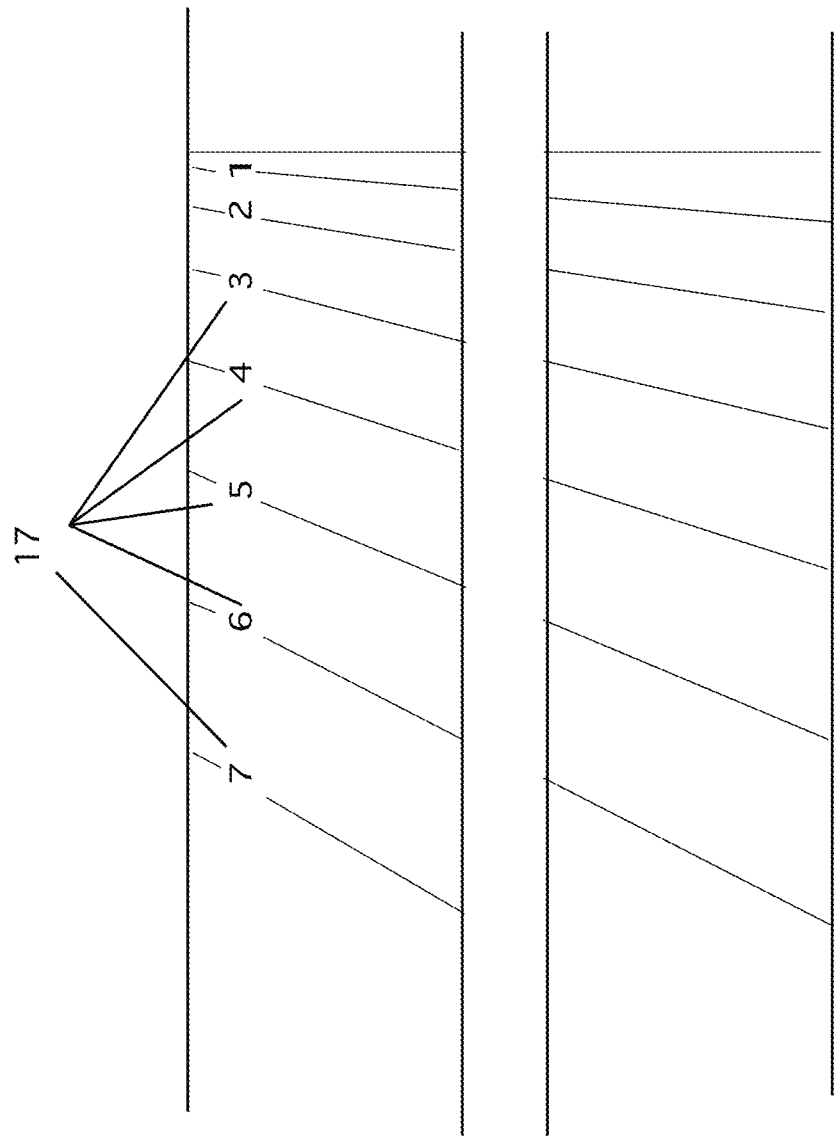
Figure 1D:
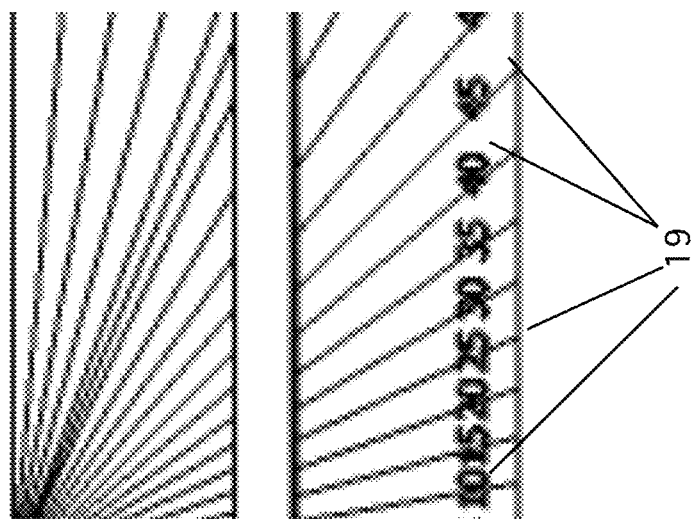
FIG. 1d is an enlarged view of a portion of FIG. 1b.

FIG. 1b is an enlarged view of the right side of FIG. 1 and FIG. 1d is an enlarged view of a portion of FIG. 1b.

This side has two important features. First, there is a 12-inch pivot point 18. This is used with the pitch marks on the left of the tool to give the proper layout for common pitches, as discussed below. This pivot works for standard 16"×24" framing squares or with smaller squares. As discussed below, the preferred embodiment is designed to work with any size square.

The right side of the front of the tool also has a number of lines that refer to angles ranging from 5 degrees to 45 degrees from the horizontal and from zero degrees to 45 degrees from the vertical. These lines act as a basic protractor 19 that is useful for scribing common angles, as described below.

Figure 2:
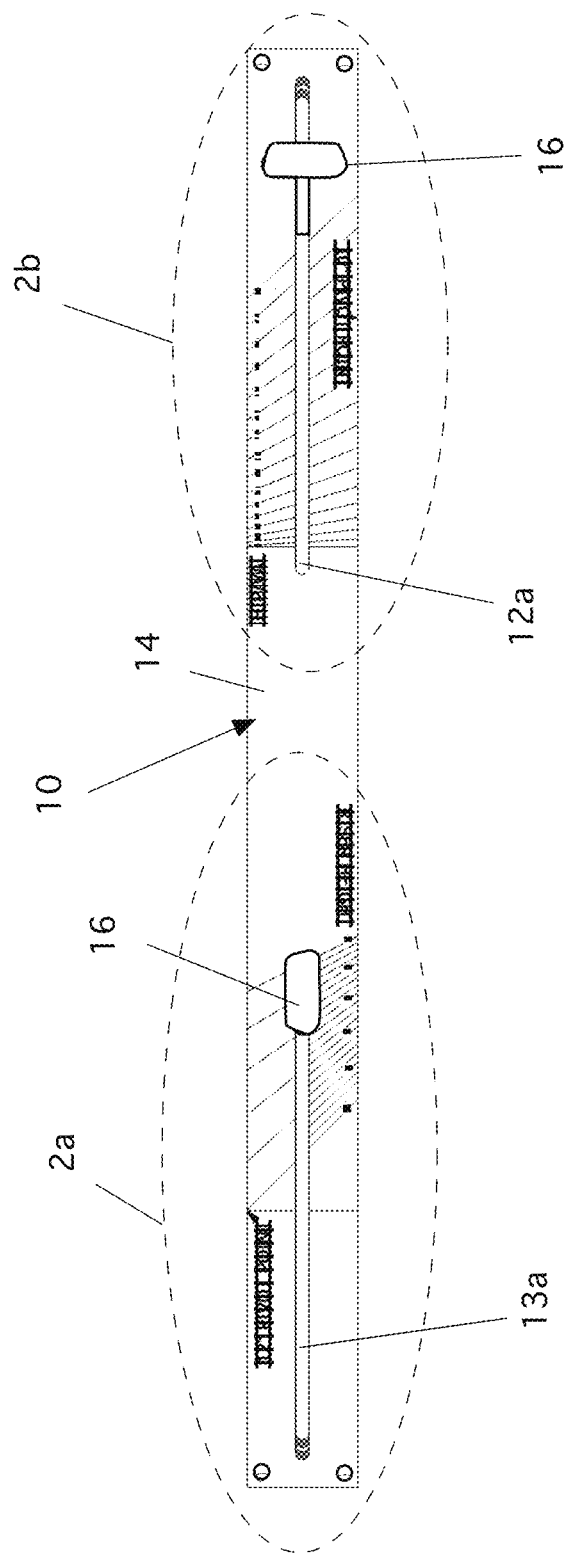
FIG. 2 is a back view of the first embodiment of the invention.
Figure 2A:
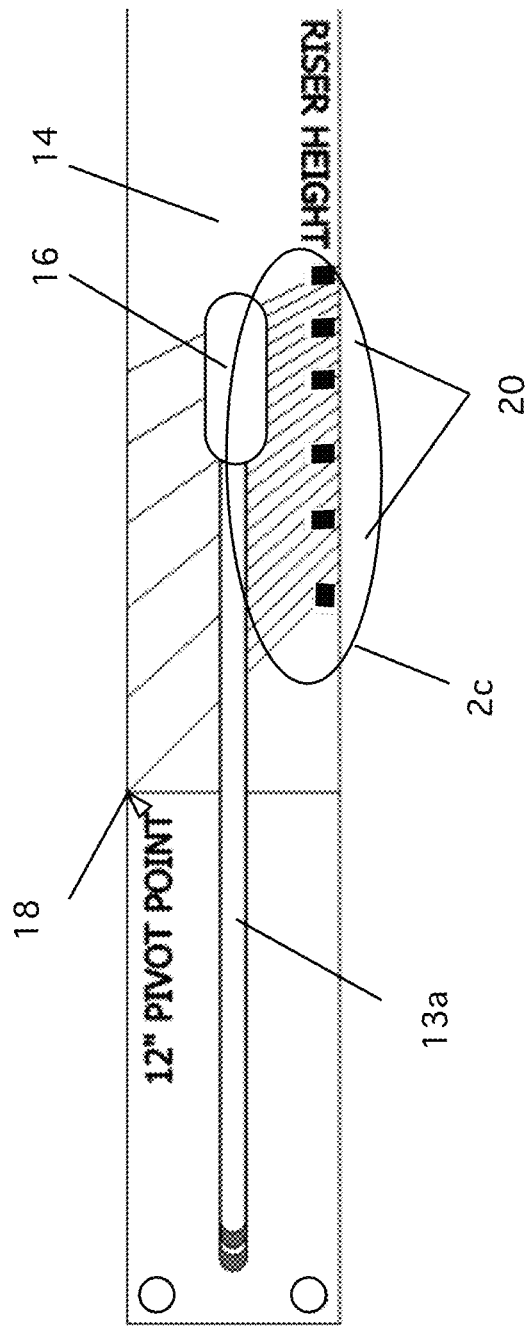
FIG. 2a is an enlarged view of the left side FIG. 2.

FIG. 2 is a back view of the invention. Here, panel 14 is shown, with slots 12a and 13a and knobs 16. This side too, has markings on both sides of the tool. FIG. 2a is an enlarged view of the left side of FIG. 2. FIG. 2c is an enlarged view of a portion of FIG. 2a. As before, the 12-inch pivot point 18 is again marked. Here also are lines 20 representing riser height. Note these lines are inverted as for measuring riser height the tool is positioned differently, as discussed below. Riser height here refers to stair riser (the vertical portion of a stair). Here, riser height ranges from 5 inches to 10 inches in ¼inch increments.

Below are the dimensions for the stair riser height lines 20 as measured from the 10" Divot point:

TABLE 2

Stair Riser Line Placement

| Riser Height | Distance From Pivot Point | Angle |
| --- | --- | --- |
| 5" | 11.180" | 26.565 deg |
| 5.25" | 11.294" | 27.699 deg |
| 5.5" | 11.413 | 28.811 deg |
| 5.75" | 11.535" | 29.899 deg |
| 6" | 11.662 | 30.964 deg |
| 6.25" | 11.792" | 32.005 deg |
| 6.5" | 11.927" | 33.024 deg |
| 6.75" | 12.065" | 34.019 deg |
| 7" | 12.207" | 34.992 deg |
| 7.25" | 12.352" | 35.942 deg |
| 7.5" | 12.5" | 36.870 deg |
| 7.75" | 12.652 | 37.776 deg |
| 8" | 12.806" | 38.660 deg |
| 8.25" | 12.964 | 39.523 deg |
| 8.5" | 13.124" | 40.365 deg |
| 8.75" | 13.288" | 41.186 deg |
| 9" | 13.454" | 41.987 deg |
| 9.25" | 13.622" | 42.769 deg |
| 9.5" | 13.793" | 43.531 deg |
| 9.75" | 13.966" | 44.275 deg |
| 10" | 14.142" | 45 deg |

Figure 2B:
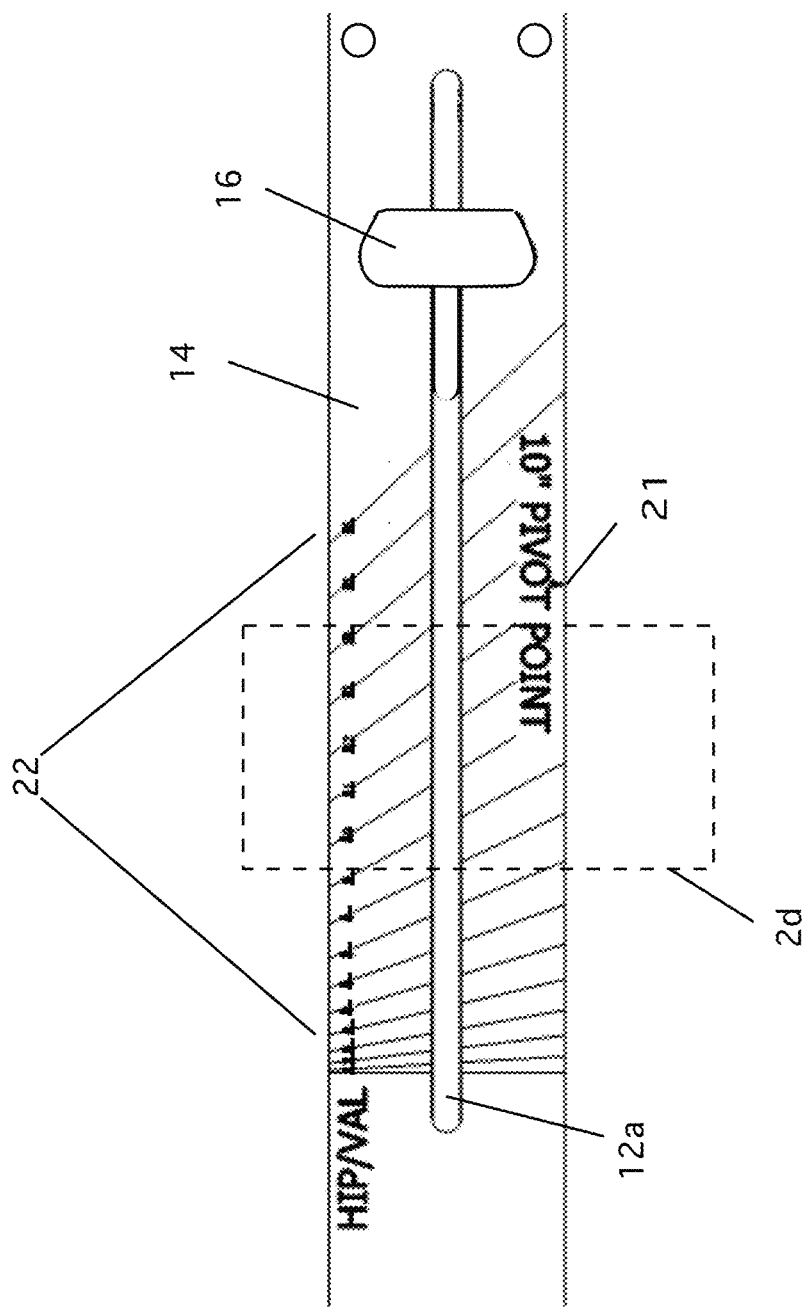
FIG. 2b is an enlarged view of the right side of FIG. 2.
Figure 2C:
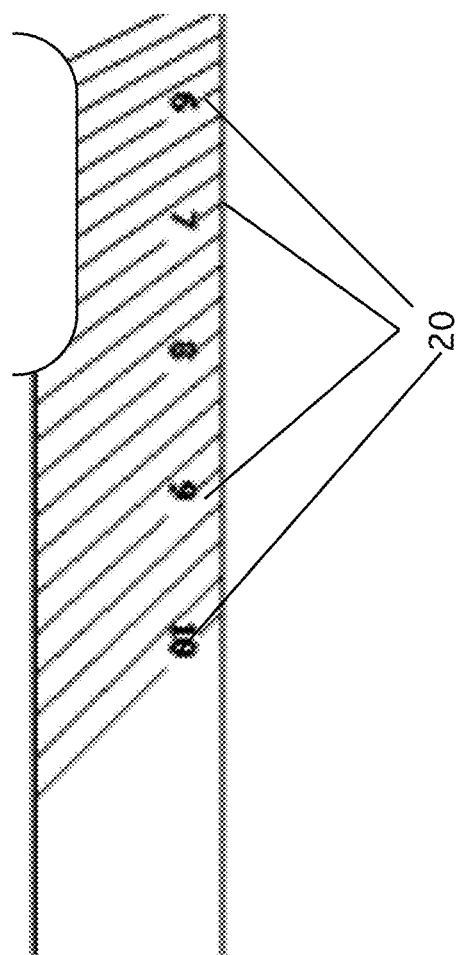
Figure 2D:
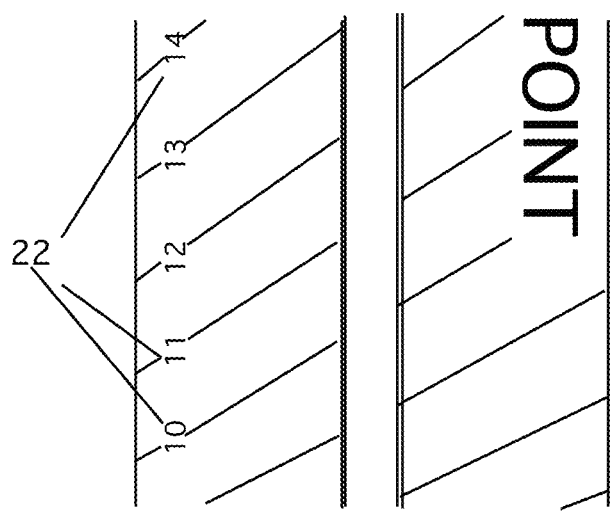
FIG. 2d is an enlarged view of a portion of FIG. 2b.

FIG. 2b is an enlarged view of the right side of FIG. 2. FIG. 2d is an enlarged view of a portion of FIG. 2b. Here, there is a marking for a 10-inch pivot point 21, also inverted. This point is also used for stair measurements, as described below. On the bottom portion of the panel are marks 22 for measuring the angles for hip or valley type rafters. Here, the numbers range from 1 pitch to a 16 pitch. The technique for marking the rafters is discussed below.

The measurements for the marks 22 for the hip/val lines are as follows. Again, these lines are measured from the 12-inch pivot point:

TABLE 3

Placement of Hip/Val Lines

| Roof Pitch | Distance from Pivot Point | Angle |
| --- | --- | --- |
| 1:12 | 12.021" | 3.376 deg |
| 2:12 | 12.083" | 6.722 deg |
| 3:12 | 12.186" | 10.025 deg |
| 4:12 | 12.329" | 13.263 deg |
| 5:12 | 12.510" | 16.417 deg |
| 6:12 | 12.728" | 19.472 deg |
| 7:12 | 12.981" | 22.416 deg |
| 8:12 | 13.267" | 25.240 deg |
| 9:12 | 13.583" | 27.939 deg |
| 10:12 | 13.929" | 30.510 deg |
| 11:12 | 14.300" | 32.951 deg |
| 12:12 | 14.697" | 35.265 deg |
| 13:12 | 15.116" | 37.454 deg |
| 14:12 | 15.557" | 39.522 deg |
| 15:12 | 16.016" | 41.474 deg |
| 16:12 | 16.493" | 43.315 deg |
| 17:12 | 16.986" | 45.051 deg |
| 18:12 | 17.493" | 46.687 deg |

Figure 3:
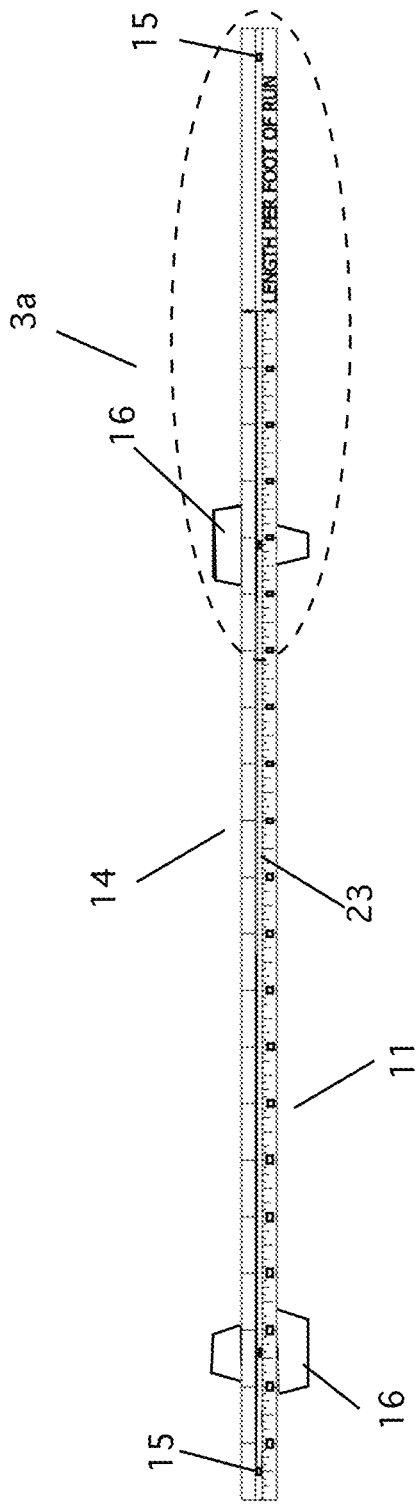
FIG. 3 is a top view of the first embodiment of the invention.
Figure 3A:
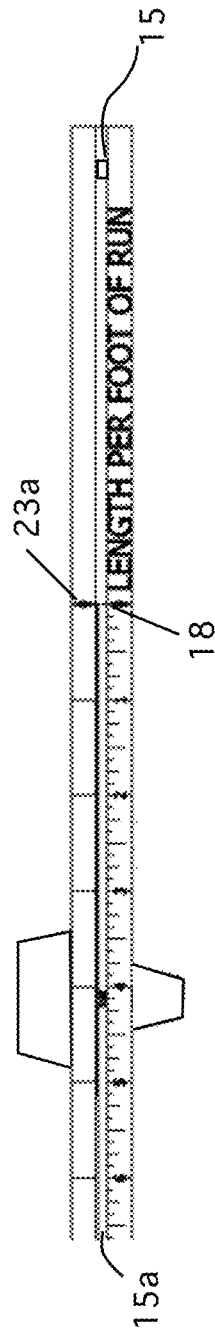
FIG. 3a is an enlarged view of the right side of FIG. 3.

FIG. 3 is a top view of the invention. As discussed above, panels 11 and 14 are connected by fasteners 15 (that are placed ½-inch from the end of the tool), which act as spacers that open a gap 15a between the two panels. This gap allows a framing square to be inserted between, as discussed below. On this surface of the tool, a straight rule 23 is provided that can be used to mark the length of run for rafters as discussed below. Note that the zero mark 23a corresponds to the 12-inch pivot point 18 on the faces of the panels. FIG. 3a is an enlarged view of the right side of FIG. 3. Here is ruler 23 is shown to be marked in one-inch segments on panel 14 and in ⅛-inch segments on panel 11.

Figure 4:
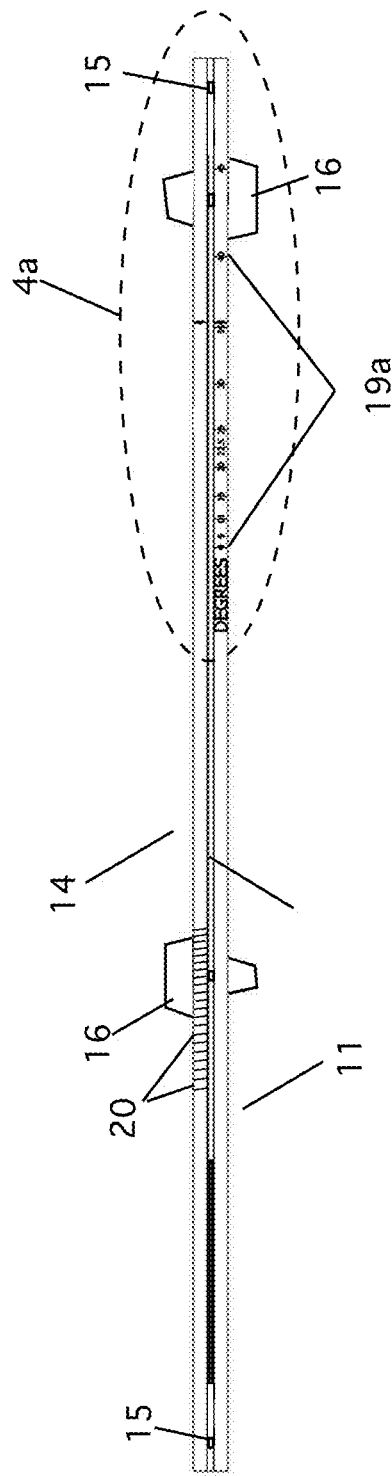
FIG. 4 is a bottom view of the first embodiment of the invention.
Figure 4A:
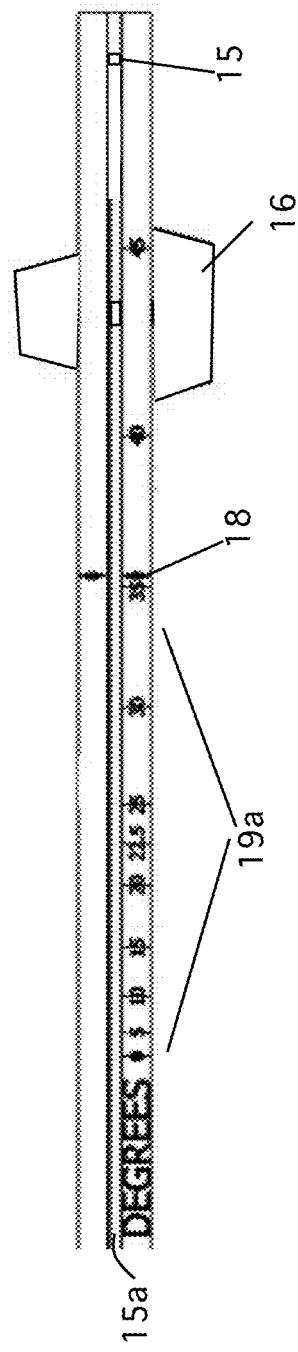
FIG. 4a is an enlarged view of the right side of FIG. 4.

FIG. 4 is a bottom view of the invention. On this face, the tool has the tops of the riser height lines 20 on panel 14 brought down. On panel 11, on the right side (see FIG. 4a.) is a protractor 19a showing angles ranging from zero degrees to 45 degrees. These are used as discussed below. Note too that the 12-inch pivot point 18 is shown. Note too, knobs 16 are shown as well.

Figure 5:
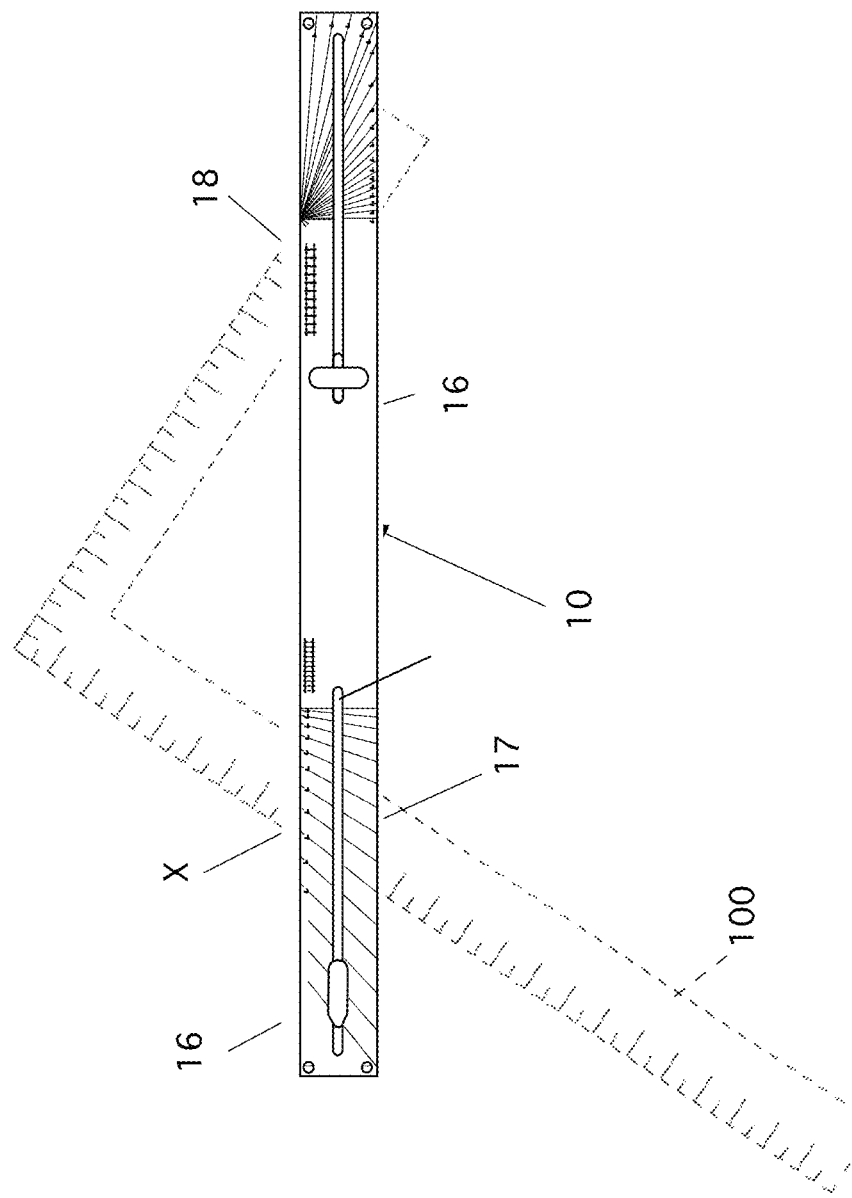
FIG. 5 is a detail view of the first embodiment of the invention being used to layout a common pitch setting for cutting common rafters.

FIG. 5 is a detail view of the first embodiment being used to layout a common pitch setting for cutting common rafters. Begin by installing a framing square 100 between the 2 panels of the tool as shown and aligning the 12" pivot point 18 on the framing square at the 12-inch mark on the framing square. With the square now pivoting on the pivot point move the square up through the body of the tool until the body of the square lines up with the mark on the tool that denotes the desired roof pitch (here shown as point "X". In the figure, a roof pitch of 8:12 is shown. When the square is in the desired position both set of knobs 16 are tightened causing friction that holds the framing square in place. With the tool held against the material a score along the body of the square using a scribe or pencil is made. In this way, multiple sets of rafters can quickly be marked and cut. Note that unlike the tools used in the prior art, no calculations are required to set the tool up. The user simply sets the pivot and moves the tool to the desired pitch line on the tool.

Figure 6:
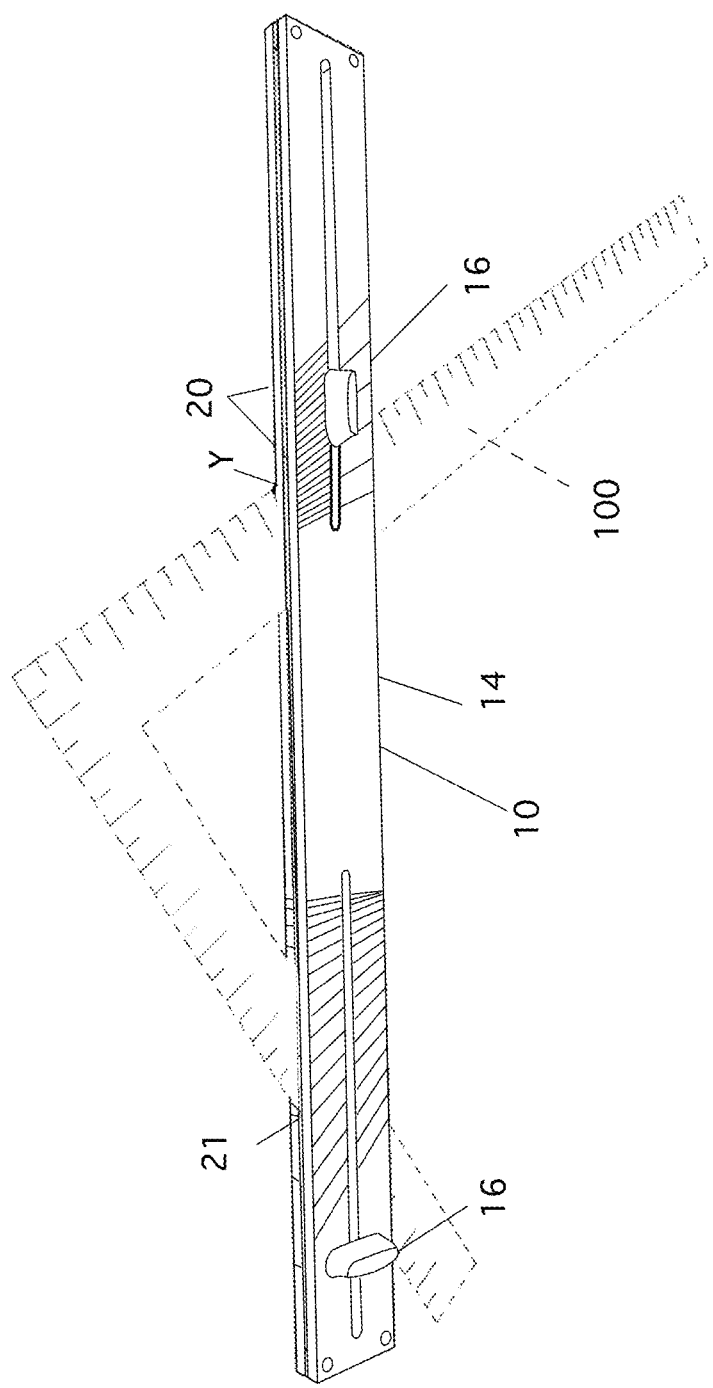
FIG. 6 is a detail view of the first embodiment of the invention being used to layout a working stair setting for cutting a set of stair stringers.

FIG. 6 is a detail view of the tool being used to layout a working stair setting for cutting stair stringers. Set the framing square to the corresponding 10" pivot point 21 then set the square body to the desired riser height. Mark the layout with the parallel edge to your workpiece and scribe the stair stringer.

Figure 7:
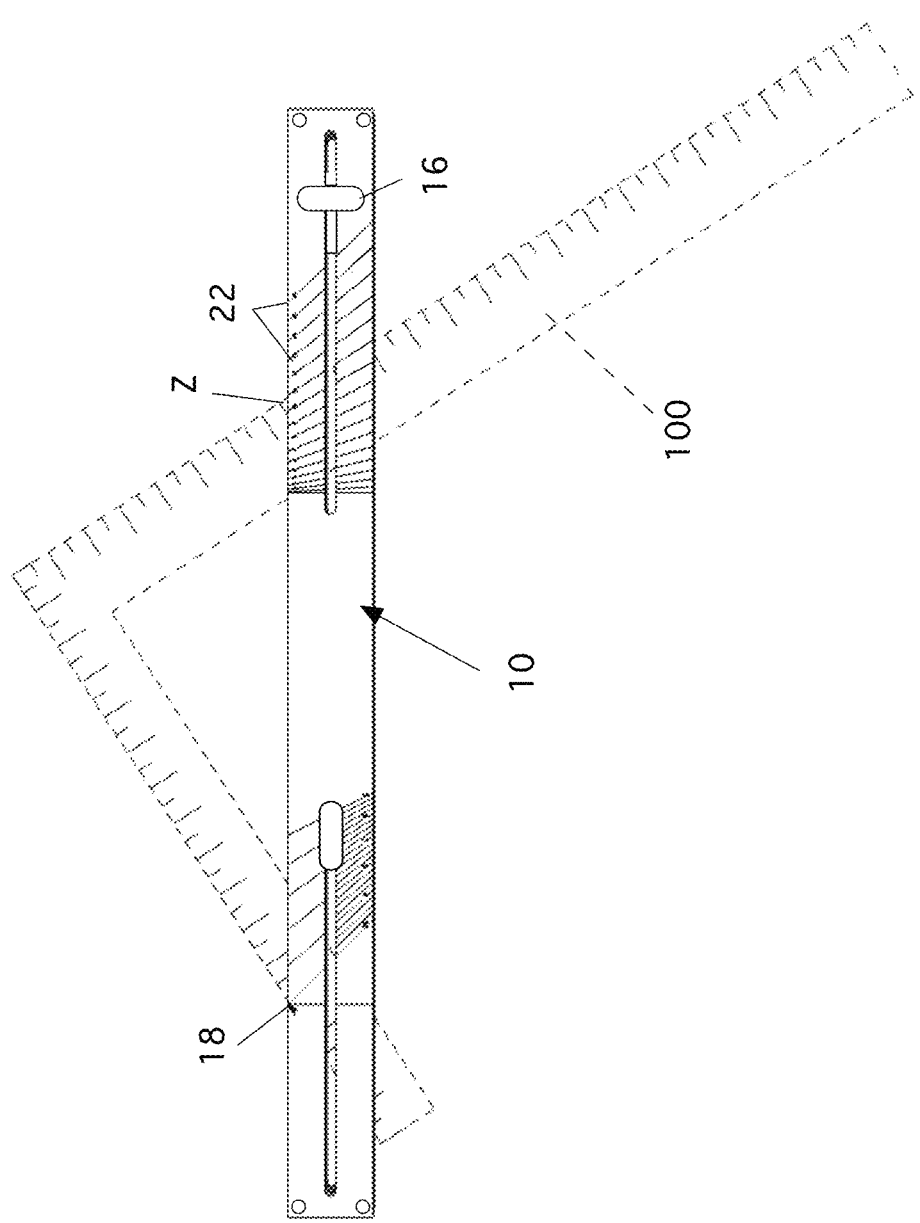
FIG. 7 is a detail view of the first embodiment of the invention being used to layout a working hip pitch setting for hip rafters.

FIG. 7 is a detail view of the tool being used to layout a working hip pitch setting for hip rafters. Here, the back of the tool is used for this task. The square is set at the 12" pivot point 18 just as when performing common rafter. Then, the body of the square is aligned with appropriate hip/val indicating line 22 (here, at point "Z") and the procedure is completed as for common rafters.

Figure 8:
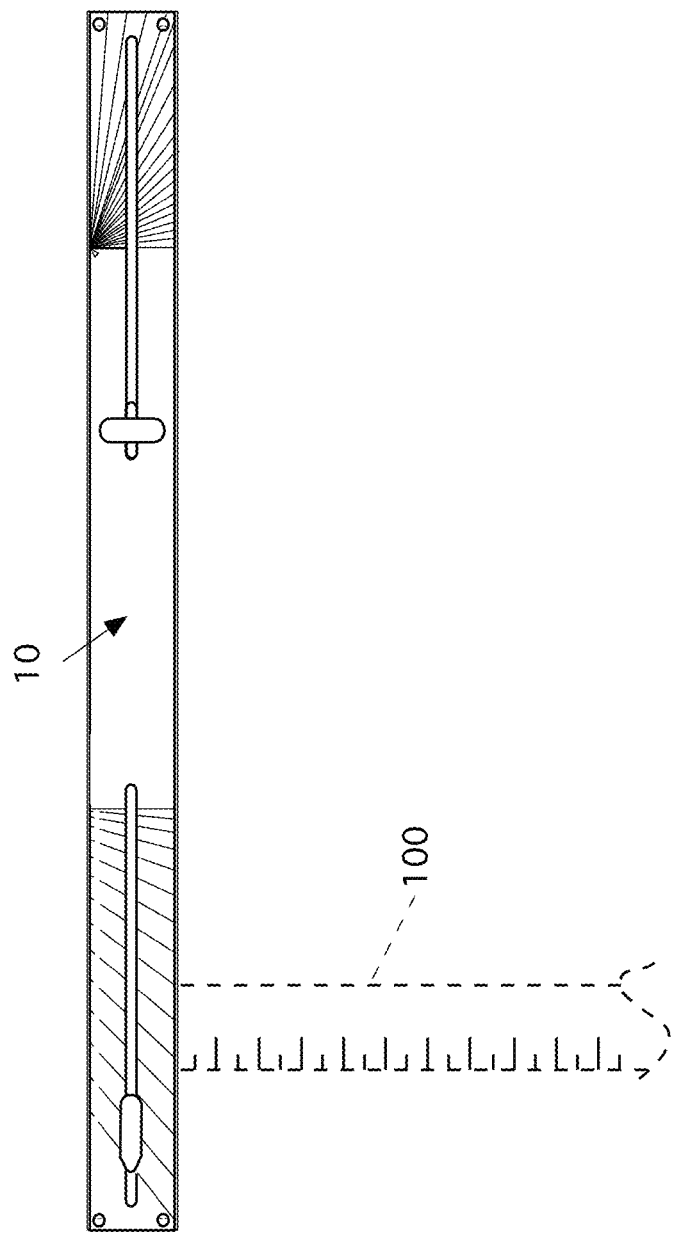
FIG. 8 is a detail view of the first embodiment of the invention being used as a working tee-square.

FIG. 8 is a detail view of the tool being used as a working tee-square. With the tool 10 in a parallel position with the tongue or body of the framing square 100, lock the tool in position with the knobs, which are tightened for this function. Once locked, the tool can be used with the square as a Tee-square for marking or for cutting sheetrock, for example. Locking the tool on the square in this position is also a good way to store the tool when it is not in use.

In addition to those functions described above, the tool can also be used for other functions. For example, to scribe angles. Here the tool is used in the same way as shown for cutting common rafters. The difference here is that the user references the degree increments located on the front (lines 19 on FIG. 1b) and or the degree markings found on the bottom side of the device (see protractor 19a on FIG. 4a).

The device can also be used to measure length per foot of run. Here, the ruler 23 on the top of the device is used for this calculation. The square is set to the proper rise per foot as in the case of FIG. 8 and the 12" mark on the square is set on the pivot point. When set, the dimension on the ruler 23 is multiplied by the number of feet in the required span to determine the appropriate rafter length.

Finally, the invention can be used to measure for level and angle cuts for truss fabrication and roof framing. Here the tool is set up as in FIG. 5. The same procedure is used as in laying out a common rafter except the user marks the perpendicular end of the square 100 with the invention parallel with the building material for level roof and truss members that intersect with rafters.

As noted above, the use of the first embodiment is limited to framing squares of 16"×24". The next embodiment is designed to work with framing squares of different sizes.

For FIGS. 9, 9a, 9b, 9c and 9d a front view of the second embodiment of the invention 24 is shown. This embodiment is designed to be used with both standard and non-standard framing squares, making this embodiment a "universal" tool. For example with a larger square such as the "Chappell" square, which is 24×18. To that end, FIGS. 9, 9a, 9b, 9c and 9d show the front of the second embodiment, which consists of a panel 25 that has two slots 26 and 27 formed in it. In this embodiment, the slots 26 and 27 and 13 are 11 inches long and are 5/16 inches wide. A second panel 28 (see FIG. 10) is attached by fastener/spacers 29 (see FIG. 11, or 12). The second panel has matching slots 26a and 27a in it such that when the two panels are connected, the slots align as shown. Knobs 30 are installed in the slots 26, 27 and 26a and 27a that allow the device to clamp down on a framing square that has been inserted in the device, as discussed below. The combination of the slots and knobs is considered as a means for temporarily locking the invention onto a framing square.

Figure 9:
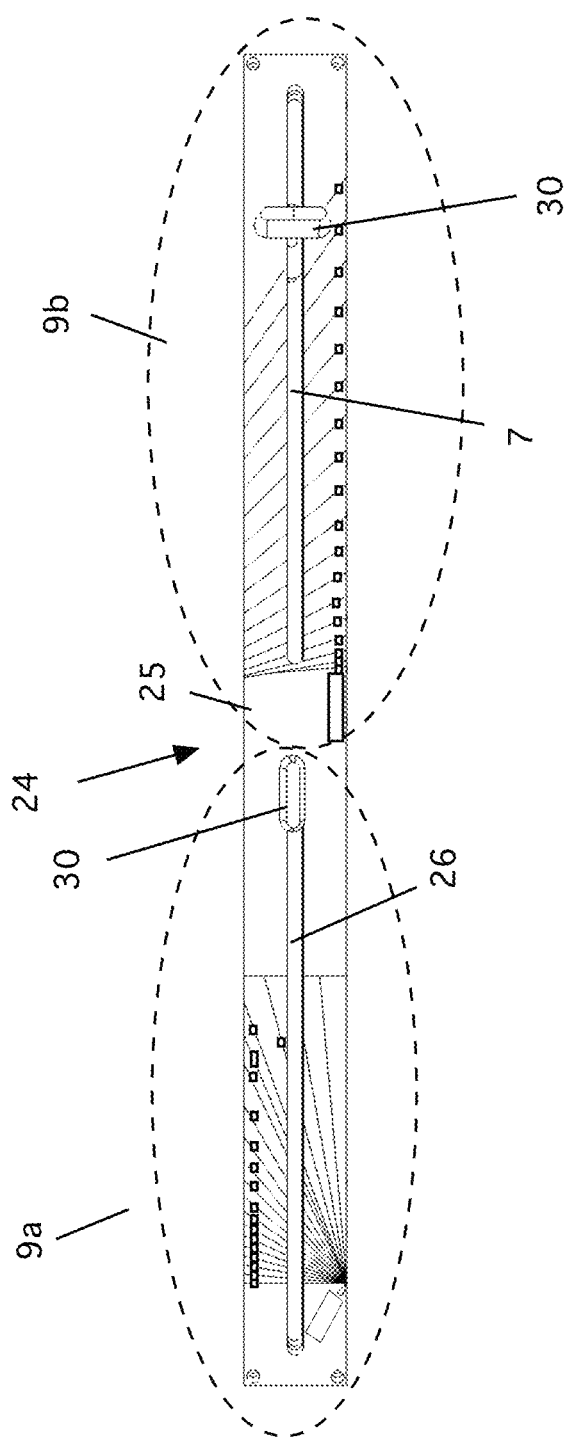
FIG. 9 is a front view of a second embodiment of the invention.
Figure 9A:
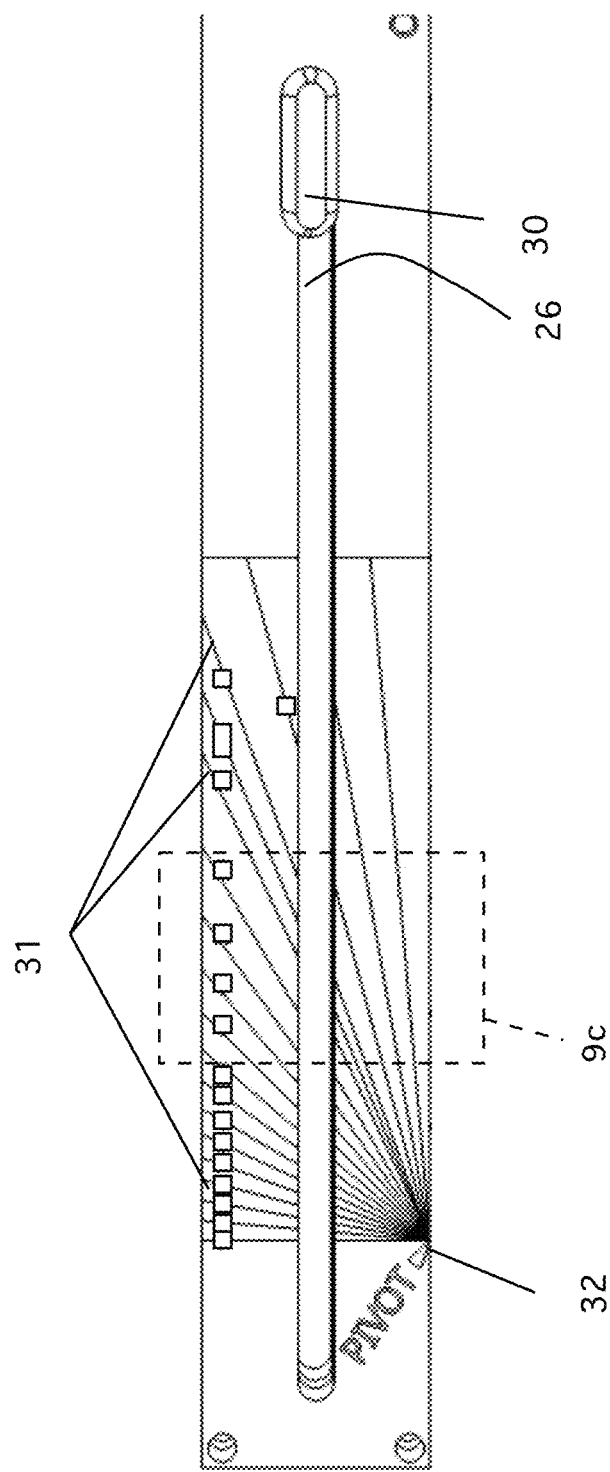
FIG. 9a is an enlarged view of the left side of FIG. 9.
Figure 9B:
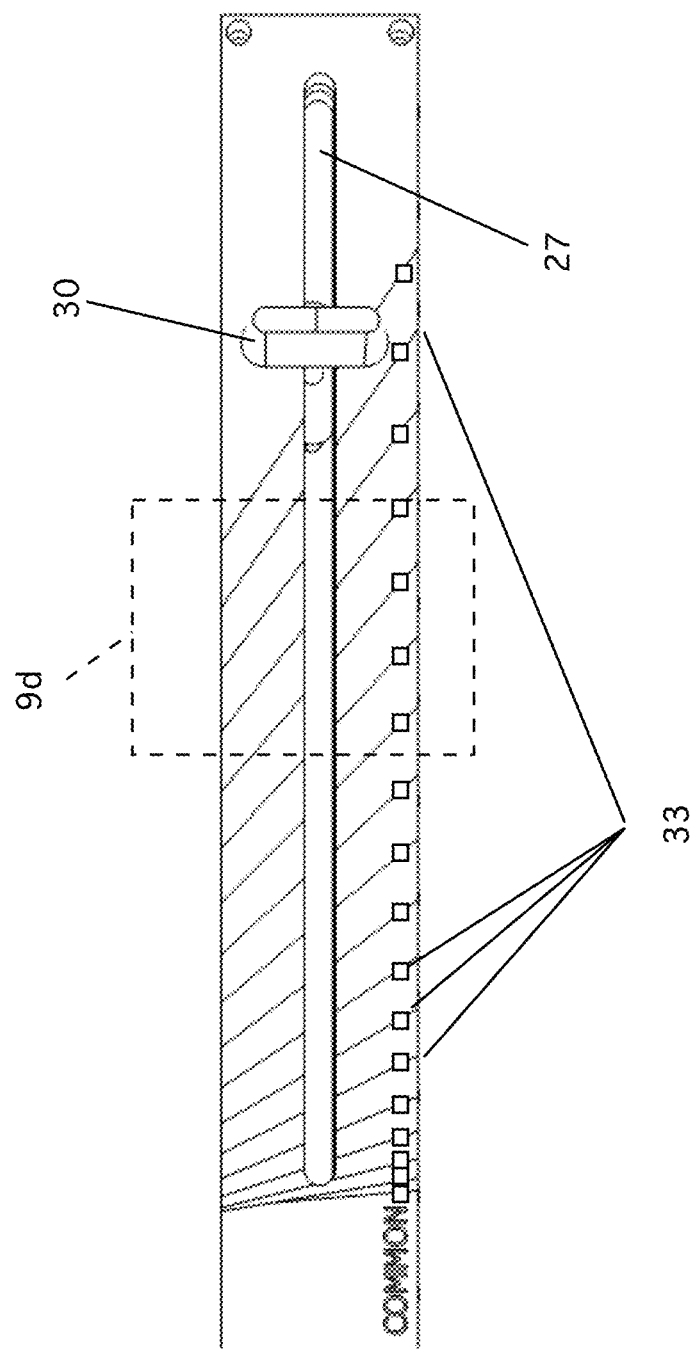
FIG. 9b is an enlarged view of the right side of FIG. 9.
Figure 9C:
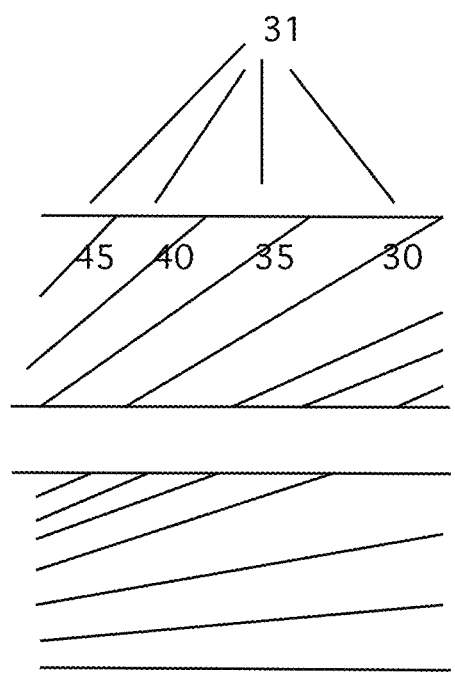

As shown, the front panel of the second embodiment has a number of markings on it used for various purposes. FIG. 9a is an enlarged view of the left side of FIG. 9. FIG. 9c is an enlarged view of a portion of FIG. 9a. Here, the markings are a number of lines that refer to angles ranging from 5 degrees to 90 degrees. These lines act as a basic protractor 31 that is useful for scribing common angles, as described below. Note too that there is a first pivot point 32 at the bottom of the front panel as shown. This pivot point is two inches from the left edge.

The right side of the front panel (FIG. 9b) has markings 33 for common rafter roof pitches similar to those of the first embodiment. FIG. 9d is an enlarged view of a portion of FIG. 9b. Note, however, that the lines are a different position as compared to those in the first embodiment. Note also that on this side, there is no 12-inch pivot point on this side of the invention (as compared to the first embodiment).

Figure 10:
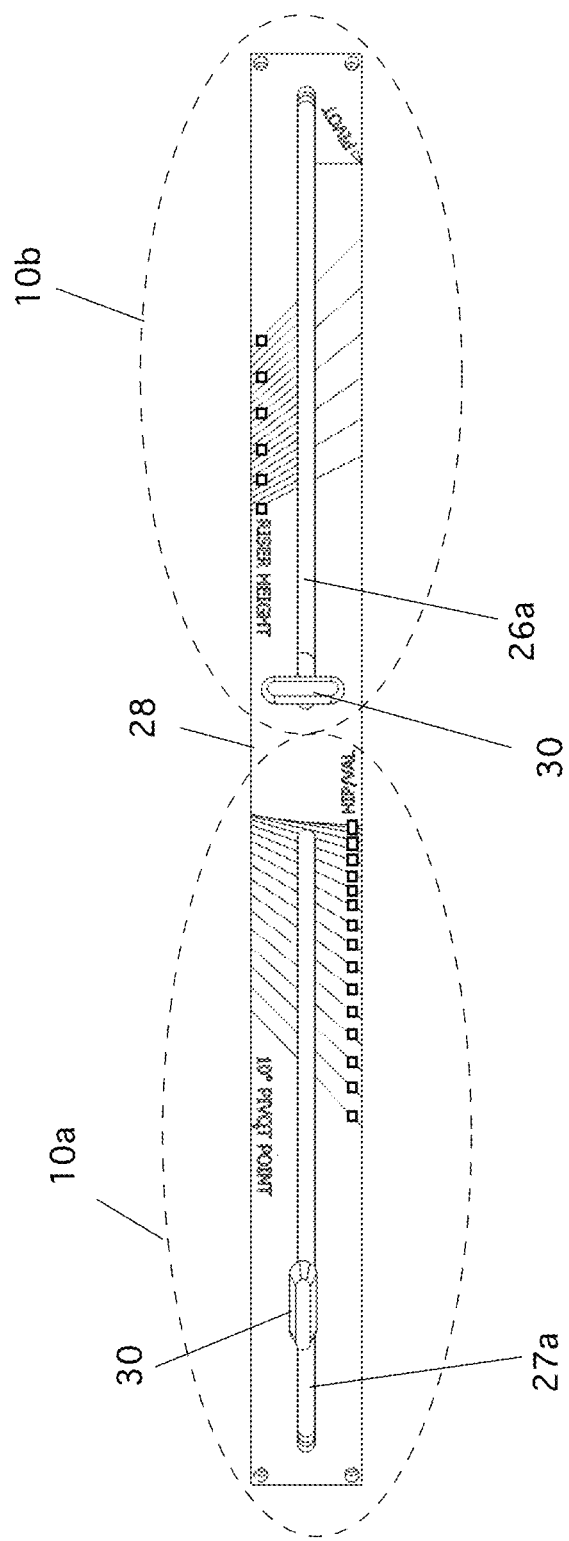
FIG. 10 is a back view of the second embodiment of the invention.
Figure 10A:
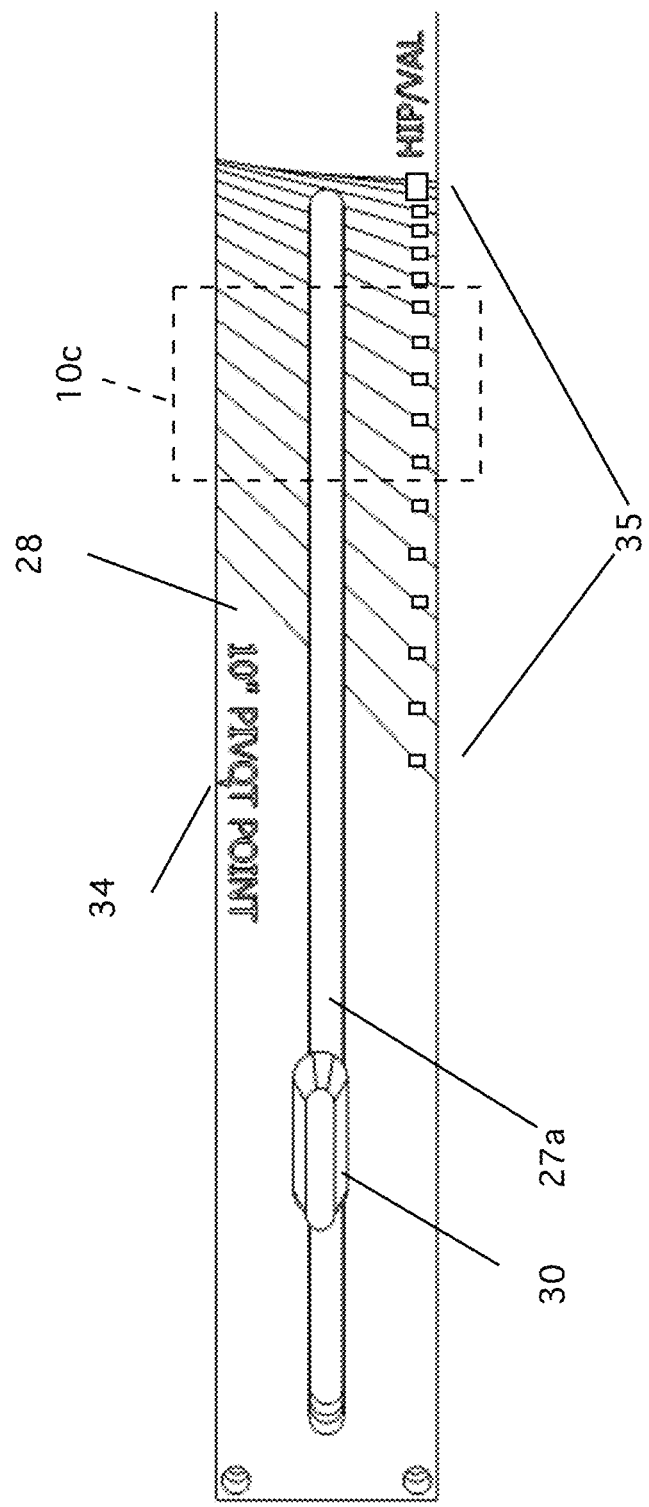
FIG. 10a is an enlarged view of the left side of FIG. 10.
Figure 10B:
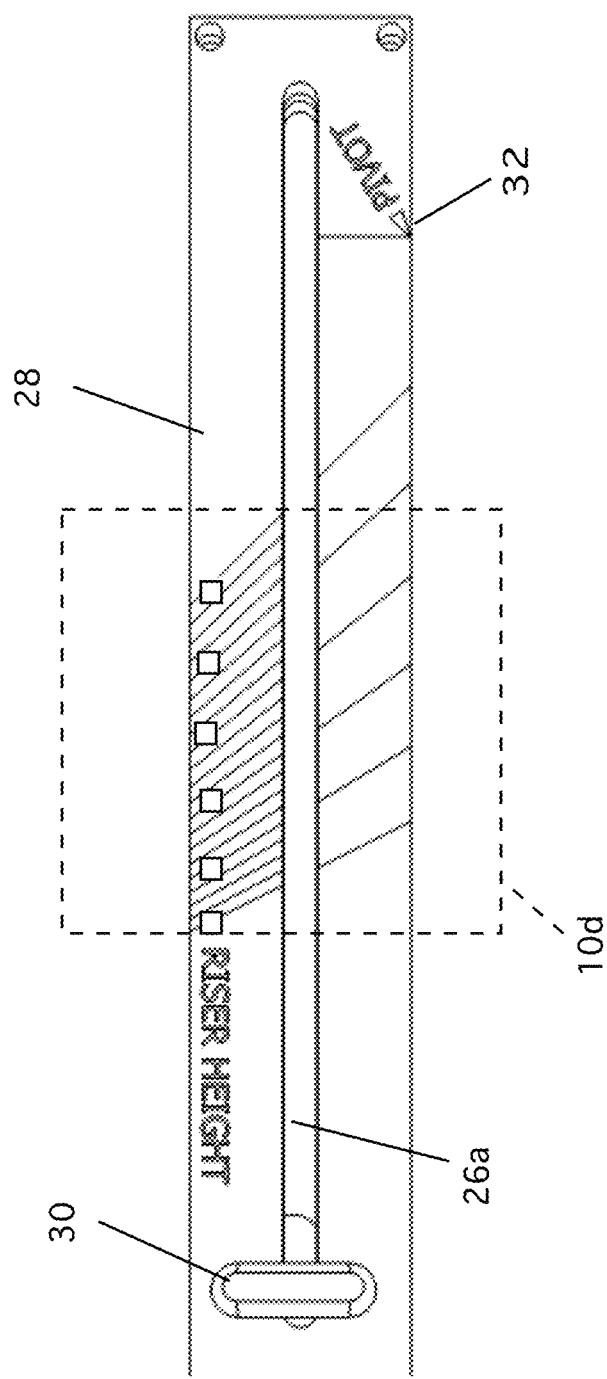
FIG. 10b is an enlarged view of the right side of FIG. 10.
Figure 10C:
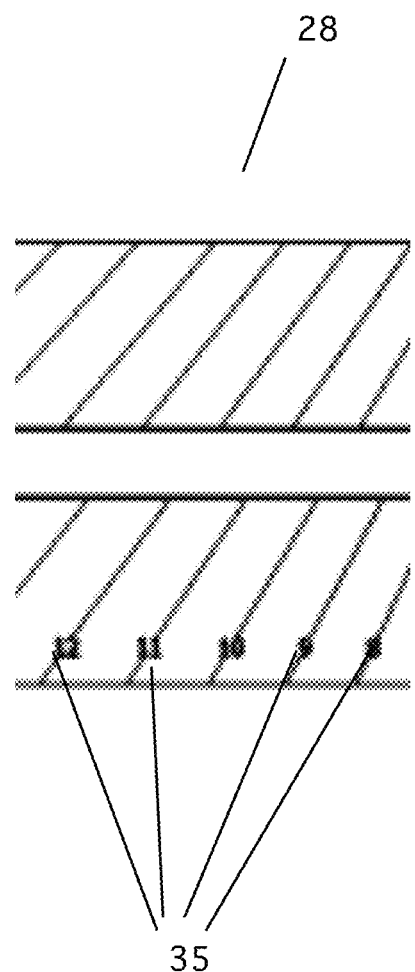
Figure 10D:
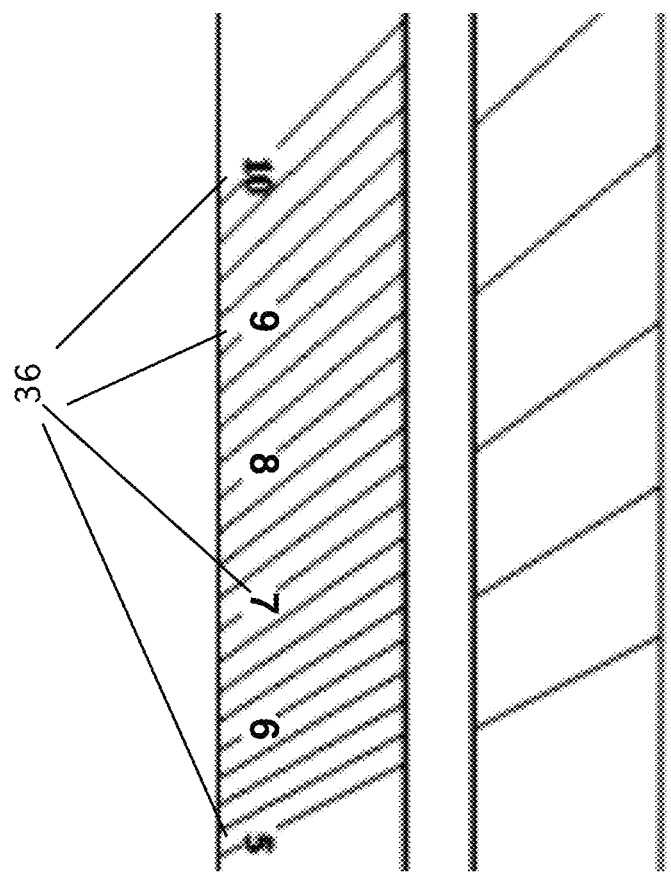
FIG. 10d is an enlarged view of a portion of FIG. 10b.

FIG. 10 is a back view of the second embodiment of the invention. Here, panel 28 is shown, with slots 26a and 27a and knobs 30. This side too, has markings on both sides of the tool. FIG. 10a is an enlarged view of the left side of FIG. 10. FIG. 10c is an enlarged view of a portion of FIG. 10a. Here, a 10-inch inch pivot point 34 is marked at the top of the tool. Here also are lines 35 for measuring the angles for hip or valley type rafters. Here, the numbers range from 1 pitch to an 18 pitch. Note that the numbers for the lines are located at the bottom of the device. FIG. 10b is an enlarged view of the right side of the back of the tool. FIG. 10d is an enlarged view of a portion of FIG. 10b. On this side, are marks 36 for riser height. Note these lines are inverted as for measuring riser height the tool is positioned differently, as discussed below. Riser height here refers to stair riser (the vertical portion of a stair). Here, riser height ranges from 5 inches to 10 inches in ¼ inch increments. Note that these lines have been relocated and modified for the second embodiment. Note too, the pivot 32 from the front of the tool, is marked at the bottom of the back, as shown.

Figure 11:
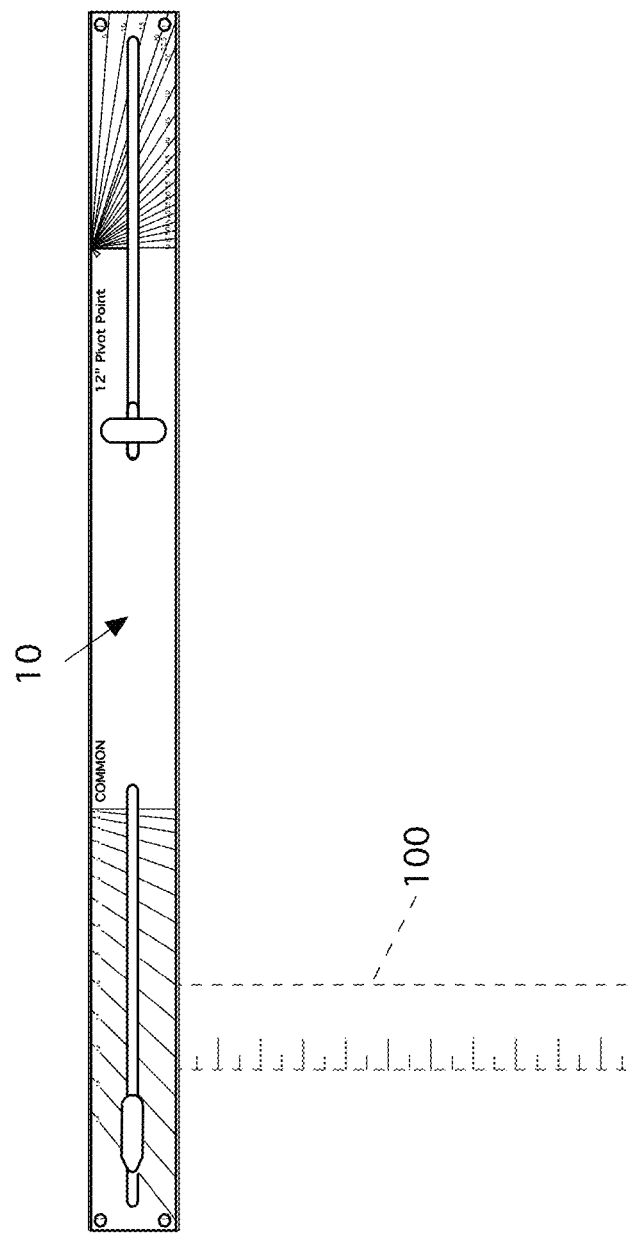
FIG. 11 is a top view of the second embodiment of the invention.
Figure 11A:
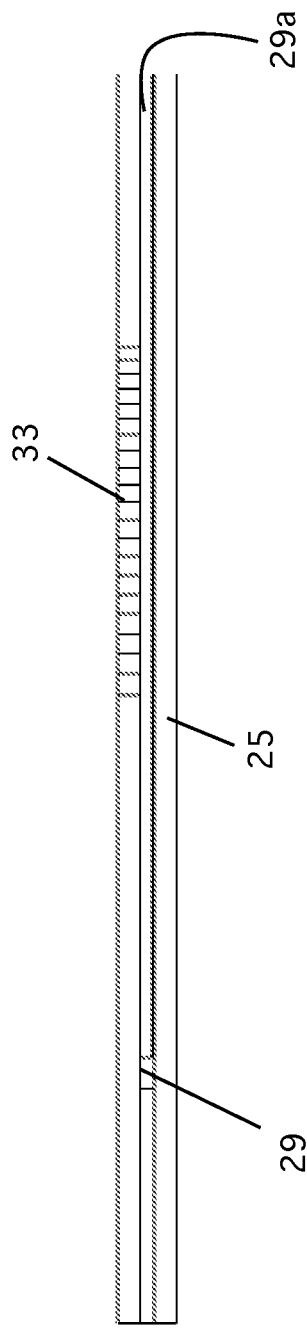
FIG. 11a is an enlarged view of the left side of FIG. 11.
Figure 11B:
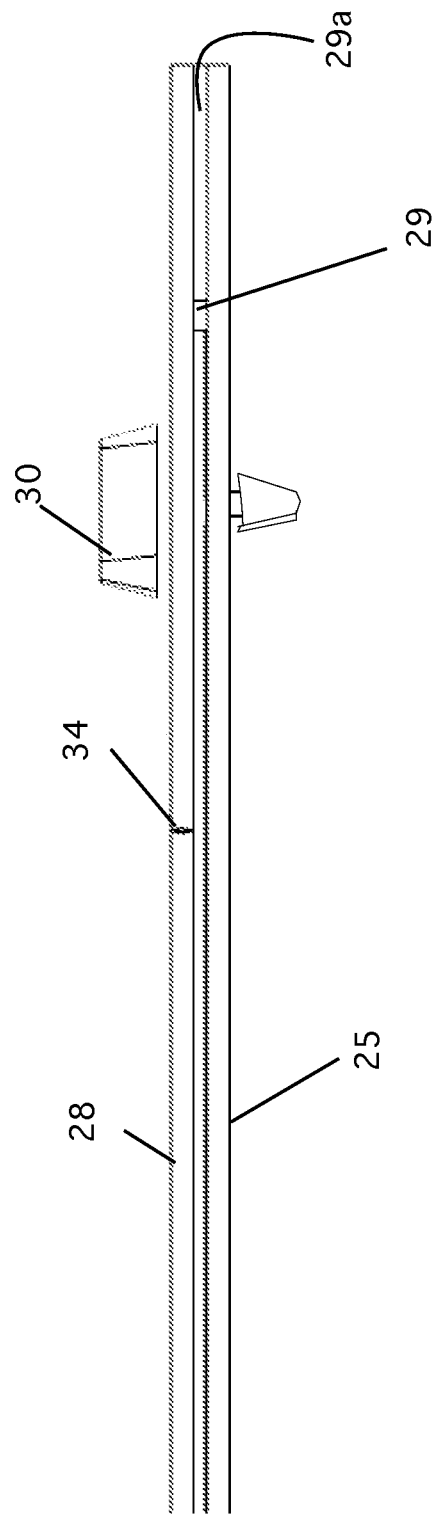
FIG. 11b is an enlarged view of the right side of FIG. 11.

FIG. 11 is a top view of the second embodiment of the invention. Here, the front panel 25 and the rear panel 28 are shown. Note too are the fastener/spacers 29. On this face, the tool has the tops of the riser height lines 33 on panel 28 brought up. Note too that the 10-inch pivot point 34 is shown. Knobs 30 are shown as well. FIG. 11a is an enlarged view of the left side of FIG. 11. Here the tops of the lines 33 are shown as noted. FIG. 11 is an enlarged view of the right side of FIG. 14. Here a detail of the pivot point 34, which is still 12 inches on the square, is shown.

Figure 12:
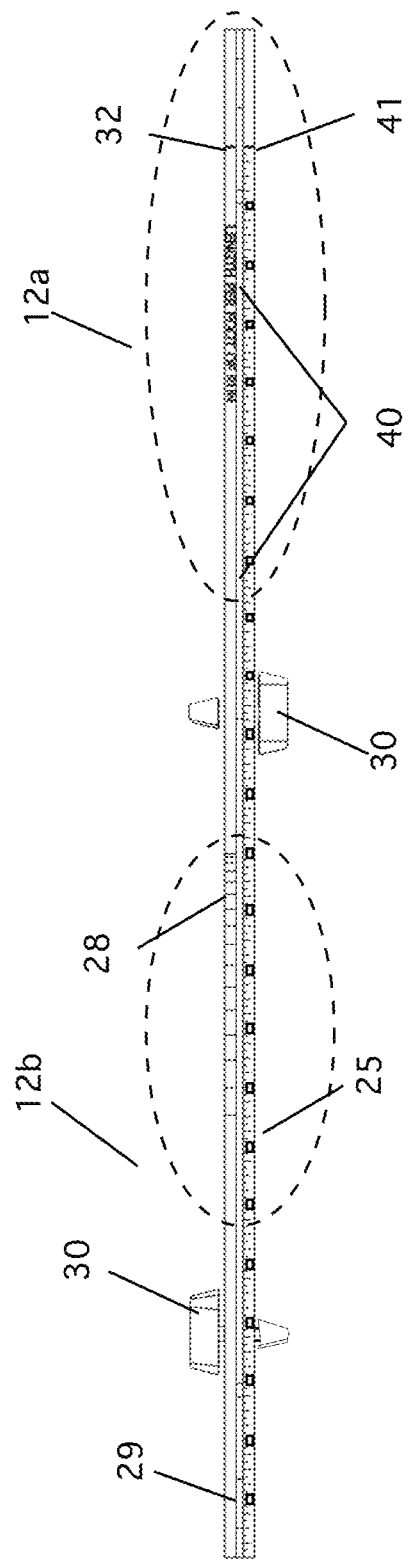
FIG. 12 is a bottom view of the second embodiment of the invention.
Figure 12A:
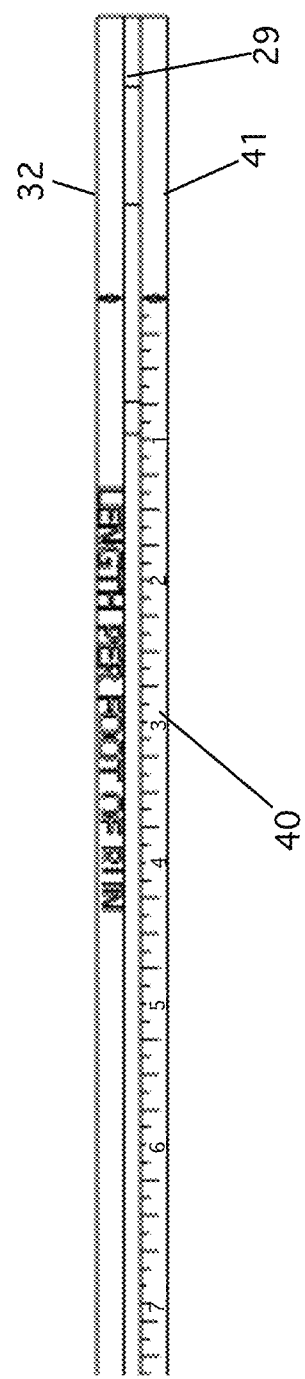
FIG. 12a is an enlarged view of the right side of FIG. 12.

FIG. 12 is a bottom view of the second embodiment of the invention. As discussed above, panels 26 and 28 are connected by fasteners 29, which act as spacers that open a gap 29a between the two panels. This gap allows a framing square to be inserted between, as discussed below. On this surface of the tool, a straight rule 40 is provided that can be used to mark the length of run as discussed below. Note that the zero mark 41 corresponds to the pivot point 32 on the faces of the panels. FIG. 12a is an enlarged view of the right side of FIG. 12. The ruler is shown to be marked in one-inch segments on panel 26. FIG. 12b is an enlarged view of a portion of the left side of FIG. 12. Here, the rule 40 is shown as well as the bottoms of the hip/val lines 35 on the face 28.

Figure 13:
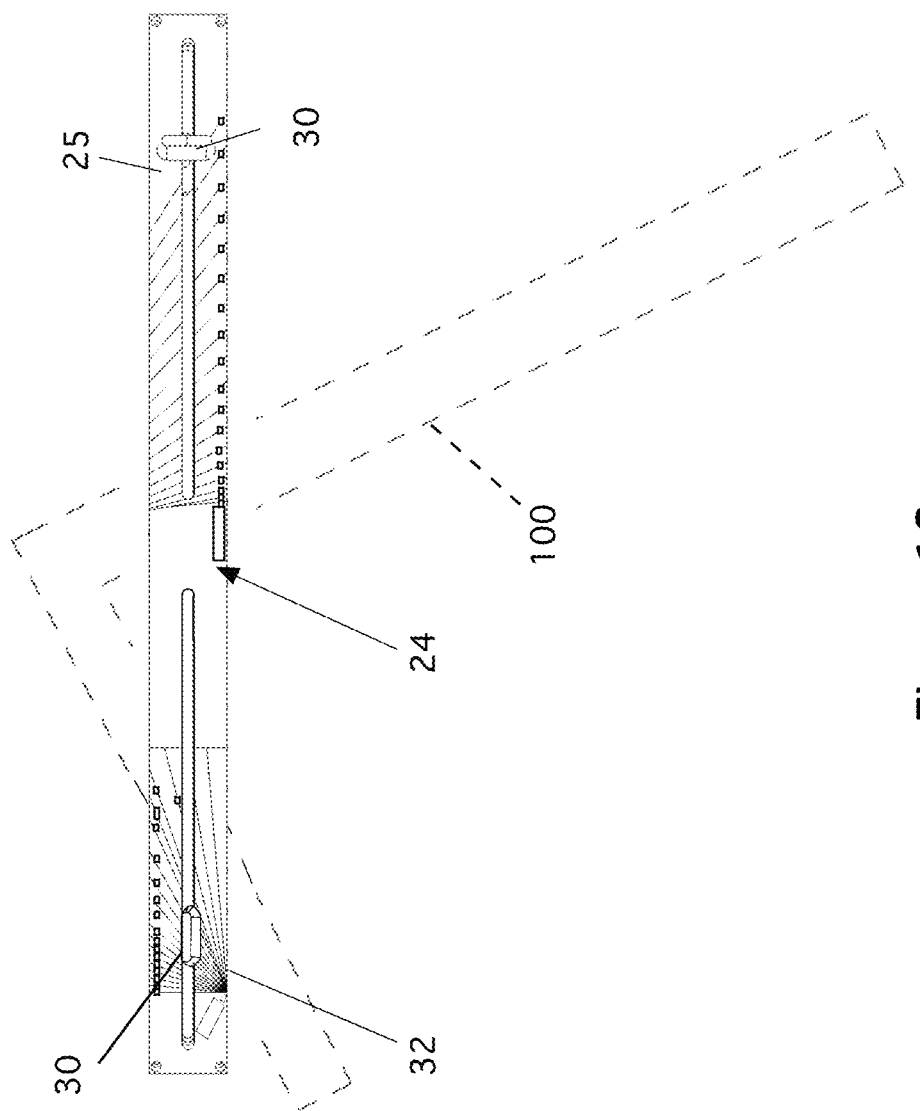
FIG. 13 is a detail view of the second embodiment of the invention being used to layout a common pitch setting for cutting common rafters.

FIG. 13 is a detail view of the second embodiment of the invention being used to layout a common pitch setting for cutting common rafters. The procedure is basically the same as that for the first embodiment. The major difference is the change on the pivot point. By placing the pivot point as shown, it is possible to use the tool with longer length squares. To use this embodiment, begin by installing a framing square 100 between the 2 panels of the tool as shown and aligning the pivot point 32 on the framing square at the 12-inch mark. With the square now pivoting on the pivot point move the square up through the body of the tool until the body of the square lines up with the mark on the tool that denotes the desired roof pitch. In the figure, a roof pitch of 6:12 is shown. When the square is in the desired position both set of knobs 16 are tightened causing friction that holds the framing square in place. With the tool held against the material a score along the body or tongue of the square using a scribe or pencil is made. In this way, multiple sets of rafters can quickly be marked and cut. Note that unlike the tools used in the prior art, no calculations are required to set the tool up. The user simply sets the pivot and moves the tool to the desired pitch line on the tool.

Figure 14:
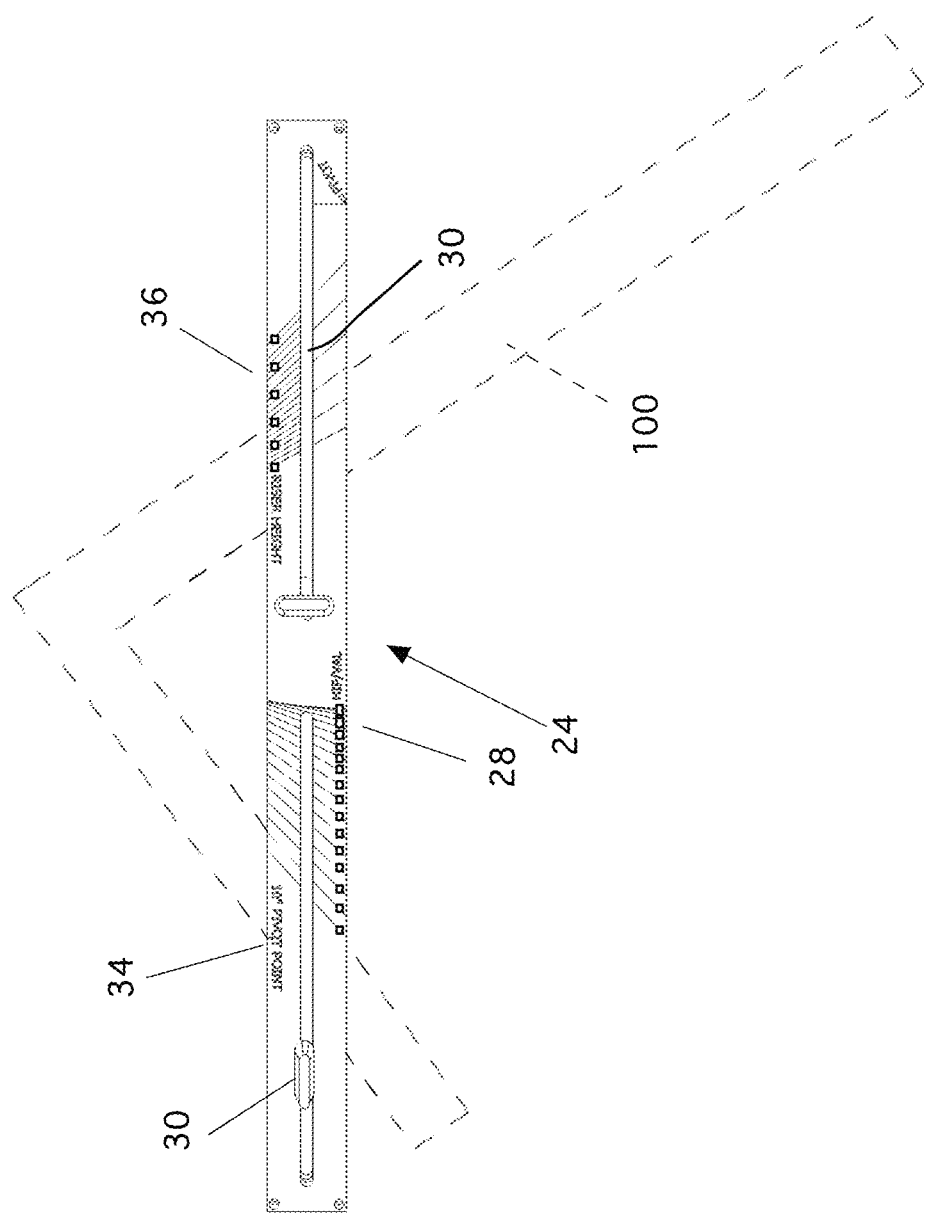
FIG. 14 is a detail view of the second embodiment of the invention being used to layout a working stair setting for cutting a set of stair stringers.

FIG. 14 is a detail view of the second embodiment of the invention 24 being used to layout a working stair setting for cutting a set of stair stringers. To use this embodiment, set the framing square 100 to the 10-inch pivot point 34 as shown. Then set the square body to the desired riser height 36. Lock the tool to the framing square and mark the layout with the parallel edge to your workpiece and scribe the stair stringer.

Figure 15:
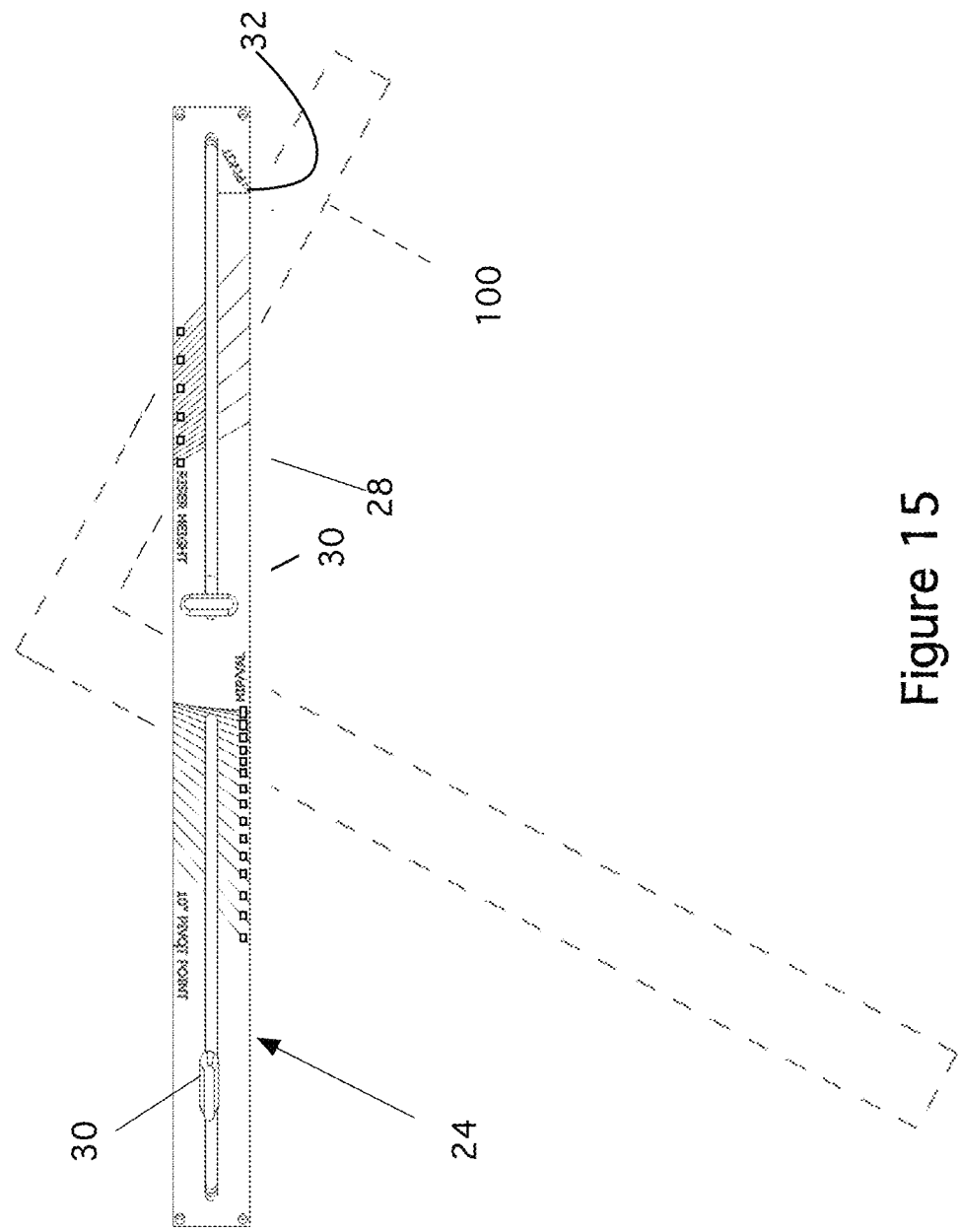
FIG. 15 is a detail view of the second embodiment of the invention being used to layout a working hip pitch setting for hip rafters.

FIG. 15 is a detail view of the second embodiment of the invention 24 being used to layout a working hip pitch setting for hip rafters. Here, the back of the tool is used for this task. The square is set at the pivot point 32 just as when performing common rafter. Then, the body of the square is aligned with appropriate hip/val indicating line 35. The tool is locked into place and the procedure is completed as for common rafters.

Figure 16:
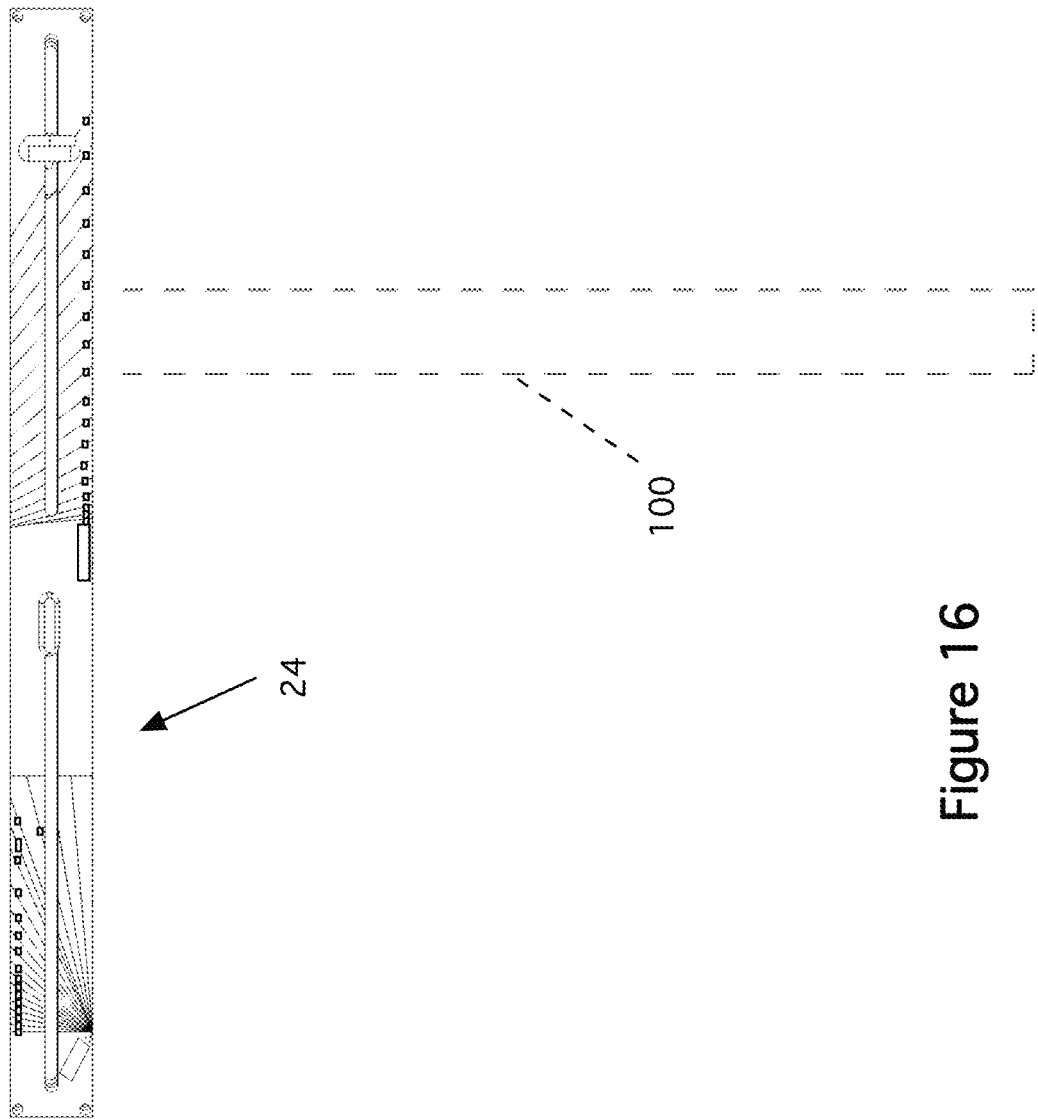
FIG. 16 is a detail view of the second embodiment of the invention being used as a working tee-square.

FIG. 16 is a detail view of the second embodiment of the invention being used as a working tee-square. With the tool 24 in a parallel position with the tongue or body of the framing square 100, lock the tool in position with the knobs, which are tightened for this function. Once locked, the tool can be used with the square as a Tee-square for marking or for cutting sheetrock, for example. Locking the tool on the square in this position is also a good way to store the tool when it is not in use. Note too, that it is possible to keep the edge of the square protruding from the tool when the tool is in the Tee square position to help stabilize the square and tool.

In addition, the device can be used to measure length per foot of run. Here, the ruler 40 on the bottom of the device is used for this calculation. The square 100 is set to the proper rise per foot as in the case of FIG. 13 and the proper mark on the square is set on the pivot point 32 on the tool 24. When set, the outermost dimension 40a on the ruler 40 is taken from the square 100 and multiplied by the number of feet in the required span to determine the appropriate rafter length. Thus for example, with a measurement of 22 inches for a 20-foot span results in a rafter length of 440 inches or 36.7 feet. Either the second embodiment or the first embodiment can be used for this measurement. Of course, the tool will be set up in accordance with that particular tool's markings.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A layout tool for use with a framing square comprising:
   a) a front panel having a top, a bottom a right end, a left end, and two slots formed therein;
   b) a back panel also having a top, a bottom a right end, a left end, and two slots formed therein;
   c) a means for attaching said front and back panel such that said front and back panels are coplanar and further wherein the two slots in said front panel are aligned with the two slots in said back panel;
   d) a means for temporarily locking the invention onto a framing square, in operative communication with said front and back panels;
   e) a 12-inch pivot point indicator marker printed on said front panel, and being positioned 5 inches from the right end of said front panel;
   f) a plurality of indicator marks referring to a plurality of common rafter roof pitches, printed on the left end portion of the front panel;
   g) a protractor printed on the right end portion of the front panel;
   h) a 12-inch pivot point indicator marker printed on said back panel, and being positioned 5 inches from the left end of said back panel;
   i) a plurality of lines, printed on said left end portion of said back panel, and being inverted thereon for measuring stair riser height;
   j) a 10-inch pivot point mark, printed on the bottom of said right end portion of the back panel and being positioned 5 inches from the right end thereof;
   k) a plurality of lines for measuring the angles for hip or valley type rafters, being printed on said right end portion of said back panel;
   l) a plurality of lines printed on the bottom of said back panel representing the tops of the stair riser height lines on the left end portion of the back panel bottom and the 12-inch pivot point located on the right end portion of the back panel bottom; and
   m) a plurality of lines representing the angles ranging from zero degrees to 45 degrees of the protractor on the front right end portion of the front panel and the 12-inch pivot point located on the right end portion of the front panel bottom.

2. The layout tool of claim 1 further comprising: a straight rule, printed on the top of said front panel; and further wherein said straight rule having a zero mark indicating the beginning of the rule positioned adjacent to the 12-inch pivot point on the right end portion of said front panel.

3. The layout tool of claim 1 wherein each of said slots has a length of 9 inches and a width of 5/16 inches.

4. The layout tool of claim 1 wherein the means for attaching said front and back panels comprise at least two fasteners with spacers attached thereto such that said front and back panels are spaced apart a distance of 1/8 inches.

5. The layout tool of claim 1 wherein the means for temporarily locking the invention onto a framing square comprise a pair of knobs.

6. The layout tool of claim 1 wherein protractor includes a number of lines indicating angles ranging from 5 degrees to 45 degrees on a horizontal plane and from zero degrees to 45 degrees on a vertical plane.

7. The layout tool of claim 1 wherein a straight ruler is printed on the top of said back panel and further wherein said straight rule having a zero mark indicating the beginning of the rule positioned adjacent to the 12-inch pivot point on the right end portion of said front panel.

8. The layout tool of claim 7 wherein the straight rule on the top of said front panel is marked in 1/8-inch segments; and further wherein the straight rule on the top of said back panel is marked in one-inch segments.

9. A layout tool for use with a framing square comprising:
   a) a front panel having a top, a bottom a right end, a left end, and two slots formed therein;
   b) a back panel also having a top, a bottom a right end, a left end, and two slots formed therein;
   c) a means for attaching said front and back panel such that said front and back panels are coplanar and further wherein the two slots in said front panel are aligned with the two slots in said back panel;
   d) a means for temporarily locking the invention onto a framing square, in operative communication with said front and back panels;
   e) a 12-inch pivot point indicator marker printed on said front panel, and being positioned 2 inches from the right end of said front panel;
   f) a plurality of indicator marks referring to a plurality of common rafter roof pitches, printed on the left end portion of the front panel;
   g) a protractor printed on the right end portion of the front panel;
   h) a 12-inch pivot point indicator marker printed on said back panel, and being positioned 2 inches from the left end of said back panel;
   i) a plurality of lines, printed on said left end portion of said back panel and being inverted thereon for measuring stair riser height;
   j) a 10-inch pivot point mark, printed on the bottom of said right end portion of the back panel and being positioned 6 inches from the right end thereof;
   k) a plurality of lines for measuring the angles for hip or valley type rafters, being printed on said right end portion of said back panel;
   l) a plurality of lines printed on the bottom of said back panel representing the tops of the stair riser height lines on the left end portion of the back panel bottom and the 12-inch pivot point located on the right end portion of the back panel bottom; and
   m) a plurality of lines representing the angles ranging from zero degrees to 45 degrees of the protractor on the front right end portion of the front panel and the 12-inch pivot point located on the right end portion of the front panel bottom.

10. The layout tool of claim 9 further comprising: a straight rule, printed on the top of said front panel; and further wherein said straight rule having a zero mark indicating the beginning of the rule positioned adjacent to the 12-inch pivot point on the right end portion of said front panel.

11. The layout tool of claim 9 wherein each of said slots has a length of 11 inches and a width of $5/16$ inches.

12. The layout tool of claim 9 wherein the means for attaching said front and back panels comprise at least two fasteners with spacers attached thereto such that said front and back panels are spaced apart a distance of $1/8$ inches.

13. The layout tool of claim 9 wherein the means for temporarily locking the invention onto a framing square comprise a pair of knobs.

14. The layout tool of claim 9 wherein protractor includes a number of lines indicating angles ranging from 5 degrees to 45 degrees on a horizontal plane and from zero degrees to 45 degrees on a vertical plane.

15. The layout tool of claim 9 wherein a straight ruler is printed on the top of said back panel and further wherein said straight rule having a zero mark indicating the beginning of the rule positioned adjacent to the 12-inch pivot point on the right end portion of said front panel.

16. The layout tool of claim 15 wherein the straight rule on the top of said front panel is marked in $1/8$-inch segments; and further wherein the straight rule on the top of said back panel is marked in one-inch segments.

\* \* \* \* \*